US009589282B2

United States Patent
Fan et al.

(10) Patent No.: US 9,589,282 B2
(45) Date of Patent: *Mar. 7, 2017

(54) SYSTEMS AND METHODS FOR BILLING CONTENT PROVIDERS FOR DESIGNATED SELECT CONTENT DELIVERED OVER A DATA NETWORK

(71) Applicant: Verizon Digital Media Services Inc., Playa Vista, CA (US)

(72) Inventors: Jerry Fan, Alhambra, CA (US); Andrew Lientz, Bellevue, WA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,438

(22) Filed: Jan. 17, 2014

(65) Prior Publication Data

US 2014/0136335 A1     May 15, 2014

Related U.S. Application Data

(63) Continuation of application No. 13/412,841, filed on Mar. 6, 2012, now Pat. No. 8,635,128.

(51) Int. Cl.
*G06Q 30/02* (2012.01)
*G06Q 30/04* (2012.01)
*G06Q 20/14* (2012.01)

(52) U.S. Cl.
CPC ....... *G06Q 30/0273* (2013.01); *G06Q 20/145* (2013.01); *G06Q 30/0241* (2013.01); *G06Q 30/04* (2013.01)

(58) Field of Classification Search
CPC .. G06Q 30/04; G06Q 30/0273; G06Q 20/145; G06Q 30/0241; G06Q 30/02
(Continued)

(56) References Cited

U.S. PATENT DOCUMENTS 6,968,175 B2   11/2005   Raivisto et al.
7,127,232 B2   10/2006   O'Neil et al.
(Continued)

OTHER PUBLICATIONS

Jordan Crook, "AT&T's Latest Boondoggle is to Let App Makers Pay for Users' Data", Feb. 27, 2012, http://techcrunch.com/2012/02/27/atts-latest-boondoggle-is-to-let-app-makers-pay-for-users-data/.

(Continued)

*Primary Examiner* — Vanel Frenel
(74) *Attorney, Agent, or Firm* — Los Angeles Patent Group; Arman Katiraei

(57) ABSTRACT

Some embodiments provide multi-tenant billing systems and methods whereby data network usage fees that are associated with delivering select content of different content providers over a data network are passed to the content provider that originates or is the source for that select content instead of the end users that request and receive the select content. A deep packet inspection server or a billing server may be configured with a list of identifiers to distinguish between the network usage that is related to the delivery of the designated free content from the network usage that is not related to the delivery of the designated free content. The network usage can be distinguished by filtering or processing usage logs that track the network usage using the configured list of identifiers. Such filtering or processing can be done in real-time or in a delayed manner in a standalone or integrated system.

18 Claims, 14 Drawing Sheets

(58) Field of Classification Search
USPC .......... 705/34, 30, 412, 52; 370/252; 726/3; 455/456.3; 709/217, 223, 232
See application file for complete search history.

(56) References Cited

U.S. PATENT DOCUMENTS

| | | | |
|---|---|---|---|
| 7,340,436 B1 | 3/2008 | Lilge | |
| 7,436,816 B2 | 10/2008 | Mehta et al. | |
| 7,822,659 B2 | 10/2010 | Haakana | |
| 7,987,252 B2 | 7/2011 | Kagan et al. | |
| 8,032,412 B2 | 10/2011 | Meinhardt | |
| 8,743,885 B2* | 6/2014 | Khan | H04L 45/308 370/395.21 |
| 9,270,603 B2* | 2/2016 | Thodupunoori | H04L 47/24 |
| 2002/0069176 A1 | 6/2002 | Newman | |
| 2003/0063750 A1 | 4/2003 | Medvinsky et al. | |
| 2003/0152039 A1 | 8/2003 | Roberts | |
| 2004/0044622 A1 | 3/2004 | Blott et al. | |
| 2005/0246282 A1 | 11/2005 | Naslund et al. | |
| 2006/0259359 A1 | 11/2006 | Gogel | |
| 2007/0149168 A1 | 6/2007 | Hariki | |
| 2007/0189514 A1 | 8/2007 | Mehta et al. | |
| 2007/0299789 A1 | 12/2007 | Young | |
| 2009/0157792 A1 | 6/2009 | Fiatal | |
| 2010/0153227 A1 | 6/2010 | Medvinsky et al. | |
| 2010/0192212 A1* | 7/2010 | Raleigh | G06Q 10/06375 726/7 |
| 2010/0198698 A1 | 8/2010 | Raleigh et al. | |
| 2011/0145115 A1 | 6/2011 | Kim et al. | |
| 2012/0155380 A1* | 6/2012 | Hodges | G06Q 30/00 370/328 |
| 2013/0138823 A1* | 5/2013 | Centemeri | H04W 76/022 709/228 |
| 2014/0115678 A1* | 4/2014 | Thodupunoori | H04L 63/0823 726/6 |
| 2015/0029866 A1* | 1/2015 | Liao | H04W 4/008 370/241 |
| 2015/0312801 A1* | 10/2015 | Khan | H04L 45/308 370/235 |

OTHER PUBLICATIONS

Billy Steele, "AT&T service in the works to let app developers pay for users' data use", Feb. 27, 2012, http://www.engadget.com/2012102/27/atandt-app-developers-pay-for-data/.
Sid Murlidhar, "Fast and Free Facebook Mobile Access with 0.facebook.com", May 18, 2010, http://www.facebook.com/blog/blog.php?post=391295167130.
Robin Wauters, "Facebook Launches Zero, A Text-Only Mobile Site for Carriers", Feb. 16, 2010, http://techcrunch.com/2010/02/16/facebook-launches-zero-a-text-only-mobile-site-for-carriers/.

* cited by examiner

SYSTEMS AND METHODS FOR BILLING CONTENT PROVIDERS FOR DESIGNATED SELECT CONTENT DELIVERED OVER A DATA NETWORK

CLAIM OF BENEFIT TO RELATED APPLICATIONS

This application is a continuation of U.S. nonprovisional patent application Ser. No. 13/412,841 entitled "Systems and Methods for Billing Content Providers for Designated Content Delivered over a Data Network", filed Mar. 6, 2012, now U.S. Pat. No. 8,635,128. The contents of application Ser. No. 13/412,841 are hereby incorporated by reference.

TECHNICAL FIELD

The present invention relates to content delivery over data networks and, more specifically, to billing for content that is delivered over the data networks.

BACKGROUND ART

Data networks operated by various service providers enable end users access to the digital content and digital services of various content providers that are located throughout the Internet. These data networks exist in many different incarnations. One such incarnation is the mobile data network that is operated by wireless service provider such as Verizon®, AT&T®, and the like. Some of the digital content that is accessible through these data networks is embodied as text, images, audio (i.e., music), video, and applications. Some of the digital services that are accessible through these data networks provide the end user access to email, social media, messaging, various cloud based services, and web browsing. As used hereafter, the term content is used to interchangeably refer to digital content and digital services.

It is the goal of the content providers to have their content reach as many end users as possible. This goal is derived from the underlying desire of the content provider to monetize the content that it originates. For example, the content provider can monetize its content by selling the content, receiving advertising revenue for advertisement that is passed in conjunction with the content, and gaining influence and exposure in order to promote goods and services of the content provider and those of others. Other content providers may want to reach as many end users as possible for non-monetary reasons including informing and educating content consumers as one example.

The prolific adoption of network enabled devices (e.g., smartphones and tablets) that can access content through mobile data networks and the rapid evolution to faster, higher capacity mobile data networks, such as 3G and 4G packet switched networks (e.g., HSPA+, WiMAX, LTE, etc.), have resulted in greater connectivity for the public at large. This connectivity allows end users to access content whenever and wherever so long as a network enabled device is within reach. Moreover, the ever increasing performance of these devices and the increased bandwidth and capacity offered by today's mobile data networks has caused an evolution in the content that is being consumed. No longer is the content being delivered primarily text based or low resolution. Instead, much of the content being delivered over the data networks today is feature rich and fully functional content including video, games, applications, etc.

This degree of connectively comes at a cost to both end users and mobile data network service providers. For the end user, the cost is manifested in the one or more data access plans that the end user pays for in order to have connectivity. This cost is usually multiplied by the number of network enabled devices that the end user has. For example, the end user may pay for one data access plan to obtain broadband data access for the home, another data access plan for a smartphone that connects through a mobile data network, and yet another data access plan for a tablet that connects through the same or different mobile data network. End users mitigate this cost by purchasing data access plans that provide anticipated amounts of data consumption. For example, an end user may opt for a less expensive one gigabyte per month data access plan as opposed to a more expensive four gigabyte per month data access plan when content consumption is expected to fall below one gigabyte of data per month. Such plans are usually subject to expensive overage fees should the end user exceed the allowed amount of data usage. In some instances, the end user may forego purchasing a data access plan for a device because of these connectively costs. Instead of paying for the data access plan, the end user may opt to only use network functionality of the device when the device is within a freely accessible WiFi hotspot. As a result of the costs for data access, much of the functionality of the device can be crippled, thereby degrading the overall end user experience.

For the mobile data network service provider, the cost is manifested in the infrastructure deployment and purchasing or licensing of wireless spectrum that is needed to expand the service provider's capacity to meet the ever increasing demand for content. To offset some of the demand, service providers have resorted to capping the amount of content that end users are allowed to consume as part of the service provider's offered data access plans. Other service providers simply charge the end user for every incremental amount (e.g., kilobyte) of content that is delivered over the service provider's network.

This metering of data network access and the associated costs discourage end users from 1) freely experimenting with new content, 2) seeking new content, and 3) accessing feature rich content (e.g., video, high bit encoded audio, applications, online games, etc.). For instance, an end user is less likely to stream video to his device when the end user has a one hundred megabyte per month access plan and the video is expected to consume a significant percentage of data from that access plan. Similarly, an end user is less likely to idly browse and access new content when the everyday content consumed by the end user (e.g., emails, commonly used networked applications, etc.) consumes a majority of the data access plan purchased by that end user. This in turn devalues the content of the content providers, lowers the return on data network infrastructure improvements, and creates a less enjoyable overall end user experience.

Accordingly, there is a need for new usage and billing models that allow end users access to select content without charging the end users for every kilobyte of data that is associated with delivering that select content to the end user. Similarly, there is a need for new usage and billing models to allow end users access to select content without increasing costs to the mobile data network service provider and without reducing revenue of the mobile data network service provider. Furthermore, there is a need for new usage and billing models to promote select content of the content providers while allowing the content providers to achieve their goals of monetizing their content by selling more content, selling more advertising, and gaining influence and exposure.

SUMMARY OF THE INVENTION

It is an objective of the embodiments described herein to provide multi-tenant billing systems and methods whereby data network usage fees that are associated with delivering select content of different content providers over a data network are passed to the content provider that originates or is the source for that select content instead of the end users that request and receive the select content. Stated differently, it is an objective to provide multi-tenant billing systems and methods whereby end users are not assessed data network usage fees for the data network usage that is related to the delivery of the select content that is designated by the data network service provider to be free content. It is further an objective to provide these and other objectives without cost to the data network service provider while also giving the data network service provider incentive to utilize these systems and methods, wherein the incentive to the data network service provider includes 1) receiving payment from one or more content providers instead of one or more end users for the data network usage that is related to the delivery of the select content and 2) providing a promotional vehicle or differentiator with which the data network service provider can offer exclusive free content or otherwise distinguish itself from its competitors. There is also an incentive for content providers to participate in such billing systems and methods and to incur the data network usage fees on behalf of some end users, wherein the incentive to the content providers includes 1) having the select content that is designated as free content reach a broader audience, 2) better establish demand for new content that is disseminated free of data network usage fees, and 3) generate revenue via alternative means made available through the delivery of the free content (e.g., advertising). In achieving these objectives, it is a goal to remove many of the barriers that prevent end users from fully accessing content when using a limited access or metered access data network, wherein the barriers would otherwise prevent end users from experimenting or trying new content and, wherein content providers are discouraged from originating new content as a result.

To achieve these and other objectives, some embodiments provide a multi-tenant billing system with associated billing methods that integrate with or replace existing billing systems of a data network service provider. It is intended that the billing system be integrated with a mobile data network that provides end user subscribers with wireless access to content on a metered or limited basis. However, the billing system may be integrated with any data network and the billing system is therefore not restricted to a mobile data network. The billing system may be wholly integrated in the infrastructure of the data network. Alternatively, the billing system may be partially or wholly integrated into the infrastructure of a third party partner of the data network service provider. For example, the billing system may be operated by a content delivery network (CDN) that partners with the data network service provider to accelerate content delivery for end users of the data network service provider.

In some embodiments, the billing system designates select content that is to pass across a data network as "free content". The billing system is a multi-tenant system by virtue of the ability to support the designation of different content from different content providers as free content. The billing system redistributes the data network usage fees that are associated with the delivery of the designated free content from the end users that receive the designated free content to the content providers that originate or are the source for the designated free content. In so doing, end users are able to receive the designated free content from the data network without incurring data network usage fees.

The billing system operates using at least one deep packet inspection (DPI) server. The DPI server may include a gateway server that monitors the traffic entering into the data network of the service provider from an external data network (e.g., the Internet) and that monitors the traffic exiting the data network of the service provider to the external data network. The DPI server monitors the content in order to track the usage of the service provider's data network on a metered basis. In some embodiments, the DPI server enters the data network usage that is associated with each instance of content that is delivered over the data network to a usage log. In some embodiments, the DPI server enters the data network usage on a per end user subscriber basis to generate different end user usage logs. Each end user usage log tracks the usage of the data network by a particular end user over a period of time. Stated differently, each end user usage log tracks the content that was requested and delivered to a particular end user subscriber of the data network.

The billing system filters the usage log(s) of the DPI server in order to redistribute the data network usage fees that are associated with the delivery of the designated free content from the end users to the content providers. In some embodiments, filtering involves removing or zeroing out the data network usage that is related to the delivery of the designated free content from the end user usage logs. In some embodiments, the billing system enters the filtered data network usage from the end user usage logs to an appropriate content provider usage log. Individually, each content provider usage log tracks the network usage that is related to the designated free content that is originated or sourced from a particular content provider and that is delivered to any number of end user subscribers of the data network. Collectively, the content provider usage logs track the data network usage that is related to the delivery of the designated free content.

Instead of filtering the usage log(s) of the DPI server, some embodiments process the usage logs to classify entries that track network usage that is related to the delivery of the designated free content from the entries that track network usage that is not related to the delivery of the designated free content.

The filtered or processed end user usage logs are then used to bill each end user for the data network usage by the end user that is not related to the delivery of the designated free content. The content provider usage logs are used to bill each content provider for the designated free content that the content provider originates or is the source of and that is delivered to various end user subscribers of the data network.

In some embodiments, the billing system filters or processes the data network usage in real-time as the content passes through the data network. To do so, the DPI server is configured with a list of identifiers for identifying the designated free content and for identifying the network usage that is related to the delivery of the designated free content. The list of identifiers identifies the content providers that originate or are the source of the designated free content based on their assigned Internet Protocol (IP) addresses, IP blocks, subnets, and other addressing. In some embodiments, the list of identifiers identifies IP addresses, IP blocks, subnets, and other addressing that are associated with a CDN or other third party that delivers the designated free content on behalf of the content providers. In some embodiments, the list of identifiers identifies the designated free content based on parameters of Domain Name System (DNS) requests, HyperText Transfer Protocol (HTTP) headers, and Uniform Resource Locators (URLs). In some embodiments, the list of identifiers identifies one or more applications that can be used to access the designated free content based on addressing, port numbering, protocols, or some combination thereof. Filtering in this manner is also referred to herein as on-the-fly filtering.

In some embodiments, the billing system further includes a billing server that aggregates the end user usage logs and the content provider usage logs from the DPI server. The billing server processes the aggregated logs to bill the end users for their usage of the data network that is not related to the delivery of the designated free content and to bill each particular content provider for the usage of the data network that is related to the delivery of content of the particular content provider that is designated as free content.

When the billing system performing on-the-fly filtering is implemented using infrastructure of the data network and a third party, such as a CDN, a DPI server of the data network is configured with a list of identifiers to identify the designated free content. The DPI server filters the end user usage logs by generating and populating the end user usage logs with the metered data network usage that is not related to the delivery of the designated free content while excluding the data network usage that is related to the delivery of the designated free content from the end user usage logs. The metering of the data network usage that is related to the delivery of the designated free content is performed by the third party partner. When the third party partner is a CDN, the caching servers of the CDN host and provide accelerated delivery for the content that is designated as free content. The caching servers track in their server logs, the network usage that is associated with delivering the designated free content from the caching servers to the end user subscribers of the data network. The billing server of the billing system then aggregates the end user usage logs from the DPI server to bill the end users for their corresponding data network usage that does not include the network usage that is related to the delivery of the designated free content. The billing server also aggregates the server logs from the CDN caching servers. From the CDN caching server logs, the billing server sums the data network usage that is related to the delivery of the designated free content on per content provider basis and bills each content provider for the amount of data network usage that is attributed to the content of the content provider that is designated as free content.

In some embodiments, the billing system performs delayed filtering. In some such embodiments, the billing system does not filter the end user usage logs in real-time, but at appointed times. In such implementations, the original log reporting function of the data network need not be modified. Specifically, the DPI server populates each particular end user usage log with any data network usage that is identified for the end user that is associated with that particular end user usage log. The billing system then filters or processes the end user usage logs at appointed times, such as at the end of an end user billing cycle.

When the billing system performing delayed filtering is wholly integrated in the infrastructure of the data network, one or more of the end user usage logs are passed from the DPI server to a billing server at one of the appointed times. The billing server is configured with a list of identifiers that identifies the content that is designated as free content. Using the list of identifiers, the billing server processes the end users logs to identify data network usage that is related to the delivery of free content. In some embodiments, the billing server zeros out or removes the identified usage relating to the designated free content from the end user usage logs before billing the end users for the remaining data network usage that is not related to the delivery of the designated free content. The zeroed out or removed data network usage, which is the data network usage that is identified as being related to the delivery of the designated free content, is attributed to the content provider that originates or is the source for the content that is designated as free content. The billing server then bills the corresponding content providers for the data network usage that is related to the delivery of the designated free content.

When the billing system performing delayed filtering is integrated in the infrastructure of the data network and in the infrastructure of a CDN, the billing server aggregates end user usage logs from the DPI server and server logs from the CDN caching servers. The billing server is configured with a list of identifiers to filter or process the aggregated logs in order to bill end users for their usage of the data network that is not related to the delivery of the designated free content and to bill the appropriate content providers for the usage of the data network that is related to the delivery of the designated free content.

BRIEF DESCRIPTION OF THE DRAWINGS

In order to achieve a better understanding of the nature of the present invention, preferred embodiments for the billing systems and associated billing methods will now be described, by way of example only, with reference to the accompanying drawings in which.

DETAILED DESCRIPTION

In the following detailed description, numerous details, examples, and embodiments for the billing systems and associated billing methods are set forth and described. As one skilled in the art would understand in light of the present description, the systems and methods are not limited to the embodiments set forth, and the systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

The billing systems and associated methods are applicable to any data network and to any service provider of a data network that provides metered or limited access to the data network. In other words, the billing systems and associated methods are applicable to any data network that bills or tracks end user usage of the data network on an incremental or metered basis. Such metered or limited access is most common with mobile data networks. Some examples of service providers that operate mobile data networks in the United States include Verizon®, AT&T®, and Sprint®. It should be apparent that several other mobile data network service providers operate within the United States and around the world, and that the billing systems and associated methods presented herein are applicable to any such data network or service provider. Accordingly, the term data network is broadly recited to encompass a data network that uses one or more network technologies propagated by wireless standards bodies of the 3rd Generation Partnership Project (3GPP) (e.g., 2.5G, 3G, 4G wireless technologies including EDGE, HSPA, HSPA+, WiMAX, LTE, etc.).

Figure 1:
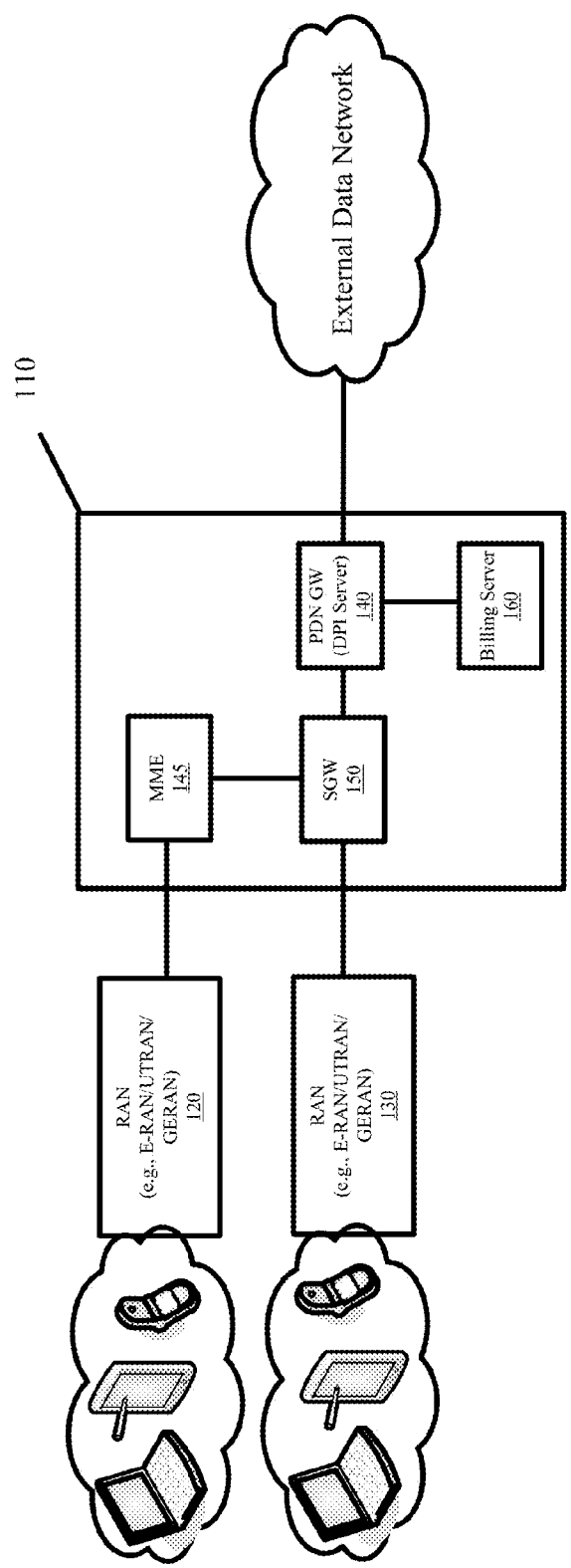
FIG. 1 presents an exemplary mobile data network architecture.

To aid in the discussion that is to follow, an exemplary mobile data network architecture is provided with reference to FIG. 1. In FIG. 1, the mobile data network includes a core network 110 and radio access networks (RANs) 120 and 130. The core network 110 includes a packet data network gateway (PDN GW) 140, a mobility management entity (MME) 145, a serving gateway (SGW) 150, and a billing server 160. The core network 110 may further include additional supporting components such as an authentication, authorization, and accounting (AAA) server and a home subscriber server (HSS).

Each RAN 120 and 130 provides wireless connectivity for end user subscribers of the illustrated mobile data network to the core network 110. Depending on the technology used to implement the mobile data network, the RANs 120 and 130 may be representative of 1) GSM EDGE Radio Access Networks (GERANs) comprising one or more base station subsystems (BSSs) that control one or more base transceiver stations (BTSs), 2) UMTS Terrestrial Radio Access Networks (UTRANs) comprising one or more radio network controllers (RNCs) that control one or more Node B's, or 3) evolved RANs (e-RANs) comprising one or more eNode B's. Each RAN 120 and 130 establishes one or more wireless service regions for the mobile data network.

An end user or end user subscriber of the exemplary mobile data network illustrated in FIG. 1 is defined as any entity that can access the external data network through any of the wireless service regions of the mobile data network. In order to gain such access, the end user may subscribe to prepaid or postpaid data access plans offered by the data network service provider. Alternatively, the end user may obtain access on a pay-as-you-go basis. End users access data networks using network enabled devices. Network enabled devices may have wired or wireless access to one or more data networks of one or more service providers. These devices may include desktop, laptop, notebook, netbook, and ultrabook computers, MiFi or personal hotspot devices, and mobile communication devices such as smartphones, tablets, portable digital assistants (PDAs). This enumerated listing is not intended to be an exhaustive listing, but merely an exemplary listing of common devices used to access data networks.

The PDN GW 140 connects the mobile data network of the service provider to at least one external data network (e.g., the Internet). Stated differently, the PDN GW 140 allows end users connected to a RAN 120 or 130 to access content from one or more external data networks. Accordingly, the PDN GW 140 serves as the entry point and exit point for content entering and exiting the mobile data network through the RANs 120 and 130. The MME 145 is responsible for tracking end user movement from one RAN to another RAN of the mobile data network. Other functions of the MME 145 include paging end users, performing handover, enforcing roaming restrictions, etc. In some architectures, the PDN GW 140 is representative of a Gateway GPRS Support Node (GGSN) and the MME 145 is representative of a Serving GPRS Support Node (SGSN).

In some instances, the PDN GW 140 performs deep packet inspection (DPI) of content entering and exiting the core network 110 for purposes of metering end user usage of the data network. Such metered usage is entered to one or more usage logs. In some embodiments, the PDN GW 140 enters the data network usage on a per end user subscriber basis to generate different end user usage logs. Each end user usage log tracks the usage of the data network by a particular end user over a period of time. Stated differently, each end user usage log tracks the content that was requested and delivered to a particular end user subscriber of the data network. Each particular end user usage log may include other information for identifying the end user that is associated with that particular end user usage log, identifying the content that is delivered to that end user, identifying the source from which the content is disseminated to the end user, and identifying the network usage or the amount of data that is consumed as a result of delivering each item of identified content from the source to the end user. In some embodiments, each end user usage log may be derived from a single master usage log, wherein that master usage log tracks the data network usage for all end users albeit with various identifiers that enable parsing of the master usage log to produce the various end user usage logs. The end user usage logs may be embodied as distinct physical logs comprising partitioned entries of the master usage log, wherein the distinct physical logs are separate files, tables, databases, or other data structures than that of the master usage log. Alternatively, the end user usage logs may represent a logical partitioning of the master usage log in which the master usage log is embodied as a single data structure with various flags, tags, or identifiers designating the logical partitioning of that data structure on an end user basis. Different data networks perform the DPI using other components instead of or in addition to the PDN GW 140. For generalization and for the purposes of the discussion that is to follow, the DPI and log reporting is generalized to be performed by a DPI server of the data network. It should be apparent to one of ordinary skill that the DPI server can include any one or more of the PDN GW 140, MME 145, a gateway device of the data network, or server that is known in the art to perform DPI. Moreover, the functionality of the DPI server may be performed by one or more separate servers whereby a first server performs deep packet inspection and a second server that is coupled to the first server generates the usage logs (e.g., end user usage logs) based on the deep packet inspection. The generalization of the DPI server is provided for application of the billing systems and associated methods to differing data network architectures and technologies. Also, reference will be made hereafter to end user usage logs. It should be apparent to one of ordinary skill in the art that end user usage logs or logs that track network usage on an end user basis can be derived from any usage log that tracks all network usage without distinguishing between end users. Specifically, end user logs can be derived from generic usage logs by splitting the network usage that is identified in the usage logs on an Internet Protocol (IP) address basis, wherein the IP address is a destination IP address or an IP address for the end user that consumes the network usage by receiving content.

The billing server 160 accesses the end user usage logs from the DPI server to bill end users for their usage of the data network on a limited or metered basis. This may include ensuring that a particular end user did not exceed his/her allotted usage of the data network and if the particular end user did exceed the allotted usage, then charging the particular end user with overage fees. This may also include charging the end user on an incremental basis. For example, the end user is charged for each kilobyte or megabyte of content delivered using the data network. Other limited or metered bases are further within the purview of this disclosure.

As noted above, the term data network and the billing systems and methods presented herein should not be limited to mobile data networks. Instead, the term data network and the billing systems and methods presented herein are applicable to any data network that operates on a metered or limited basis including data networks operated by broadband service providers, satellite service providers, and operators of "hotspots" as some examples. Such data networks may use one or more network technologies propagated by the Institute of Electrical and Electronics Engineers (IEEE) (e.g., 802.3, 802.11, etc.) in addition to or instead of any of the above described wireless network technologies.

As will be explained in greater detail below, integration of the billing systems and associated methods of some embodiments with a data network may involve modifying operation of the DPI server and/or billing server of the data network. Alternatively, integration of the billing systems and associated methods of some embodiments with a data network may involve utilizing a DPI server and/or billing server of a third party to perform billing on behalf of the data network.

I. Overview

Figure 2:
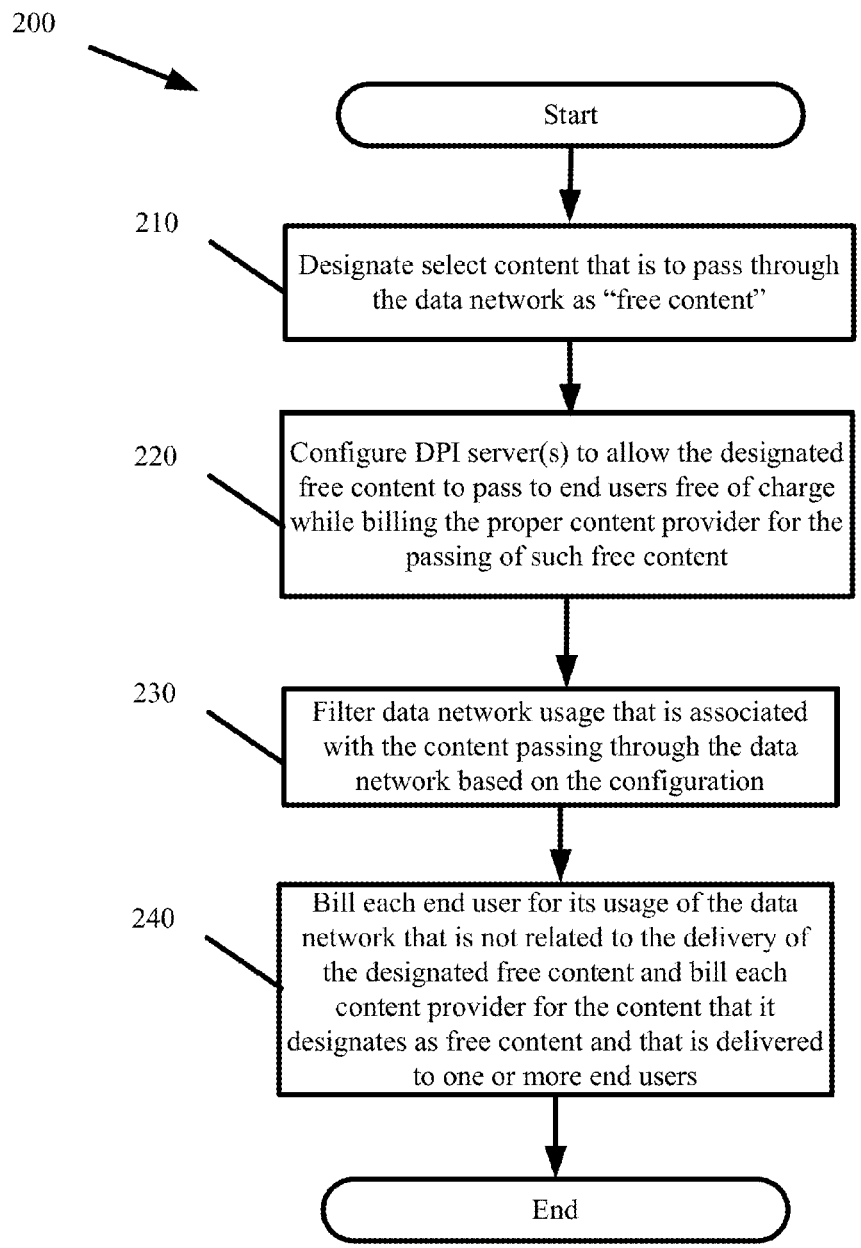
FIG. 2 provides an overview process for delivering select content to end users over a data network in accordance with the billing systems and associated methods of some embodiments, whereby the data network usage fees for delivering the select content over the data network is incurred by the content providers that originate or are the source for the content and not by the end users that request and receive the select content using the data network.

FIG. 2 provides an overview process 200 for delivering select content to end users over a metered or limited access data network in accordance with the billing systems and associated methods of some embodiments, whereby the data network usage fees for delivering the select content over the data network is incurred by the content providers that originate or are the source for the content and not by the end users subscribers of the data network service provider that request and receive the select content using the data network.

The process 200 begins by designating (at 210) select content that is to pass through the data network as "free content". Content that is designated as free content is content that passes through the data network with the data network usage fees associated with the passing of such content being incurred by the content provider instead of being incurred by the end users that request or receive such content. In some embodiments, the fees for delivering the free content may be incurred by a third party promoter instead of the content provider. The third party promoter can be an entity that promotes content of a content provider on behalf of the content provider. The content provider may use an online interface provided by the data network service provider to designate some or all of its content as free content. In some embodiments, the content provider designates some or all of the its content as free content using an online interface that is provided by a content delivery network (CDN) that is partnered with one or more data networks to provide the billing system functionality described herein. It should be apparent to one of ordinary skill in the art that other means besides an online interface may be used to designate the free content. For example, a content provider may directly contact an agent of the data network to designate some or all of its content as free content. Also, an agent of the data network may contact a content provider when the data network desires to offer its end user subscribers certain content free of data network usage fees as a way to differentiate its offerings from other data networks or service providers.

The incentive for a content provider to incur the data network usage fees that are related to the delivery of the designated content is that the designated content that is delivered free of network usage will likely reach a larger audience than content that is not delivered free of network usage fees. This is because end user subscribers that subscribe to a voice plan but not a data access plan of a particular data network service provider will nevertheless be able to receive the designated content using that data network. Also, end users that have limited data access plans are able to receive the designated content without fear of consuming data from their limited data access plan and without fear of incurring overage fees.

The designated free content may be identified to the end users through search engine results that provide some indication (e.g., graphical, textual, audible, etc.) as to which websites offer designated free content. The content provider may denote the designation of free content in its URLs or page descriptions (e.g., www.provider.com/main_free_content.html). Additionally, "apps" or applications that are downloaded from a store or marketplace may provide in the description of the app whether the app accesses designated free content of one or more content providers and thus, the app can be used without consuming data from the data access plan of the end user. In some cases, the particular data network service provider distributes an application to its end user subscribers whereby the application can only be used to access the designated free content offered by the data network. Consequently, end users are able to consume more content without being charged for such consumption.

The content provider benefits from this increased consumption and the resulting exposure in various ways. One way the content provider benefits is by creating demand for the designated content and thereafter charging for continued consumption. For example, the content provider incurs the access fees or network usage fees in order to offer particular content as part of a free trial. The free trial allows end users to experiment with and learn about the features and services that are associated with the particular content without utilizing data from their data access plans and without incurring data network usage fees. At the end of the free trial, the end users, now familiar with the features and services of the particular content, can choose to continue to receive the particular content on a subscription or pay basis and the data network usage fees for continued access to the particular content are incurred by the end users. Another way that the content provider can benefit is by offering one free service in association with the free content, but receiving monetary compensation for another service that is associated with the free content. For example, the free content may include free access to an online store, whereby data usage fees to interact with the online store are incurred by the content provider. However, any purchases made at the online store are paid to the content provider. Another way that the content provider can benefit is by offsetting the incurred costs by including advertising in the free content and by collecting fees from the advertisers for the placement of the advertisements in the free content. Yet another way that the content provider can benefit is through increased name recognition and increased market share or presence that the content provider can achieve as a result of offering free access to its content.

The incentive for a data network service provider to participate in such a billing system is that the service provider is provided a new promotional platform with which to promote its data network or differentiate its service and offerings from other service providers. For example, the service provider offers "hot" content of a particular content provider to its end user subscribers for free. End users that are deciding which service provider to subscribe to for data access may perceive the free "hot" content as added value in otherwise analogous service. Other end users may have brand loyalty to a particular content provider or may have such interest in the content of a particular content provider that a particular service provider offering content of the particular content provider for free will persuade the end users to subscribe to or better value the particular service provider. For example, a first service provider may allow free access to news from the content provider www.cnn.com as a means to differentiate its service and data network from a second service provider. Even without these benefits, there is no cost to the service provider as the content providers reimburse the service provider for whatever cost is offloaded from the end users.

The incentive for an end user is that the end user incurs less data network usage fees or consumes less data from a metered or limited data network access plan. As a result, the end user can more freely try new content, consume more feature rich content, and receive greater value from otherwise analogous service. More specifically, an end user receives greater value from a 4G data network service provider that charges X dollars for Y megabytes of data and that offers free content relative to other 4G data network service providers that also charge X dollars for Y megabytes of data, but that do not offer any free content.

In some embodiments, the data network service provider may agree to offset or reduce some of the fees that are incurred by a content provider for the delivery of the free content designated by that content provider. The service provider may do so when there is perceived benefit to the service provider. For example, the service provider may provide its end user subscribers with free access to certain content without passing the full data network usage fees to the content provider that originates the certain content in order to increase the subscriber base of the service provider or to promote certain content that can later result in increased revenue for the service provider. Continuing with the example, the service provider may offer free video streaming for videos of a particular content provider for one month through its data network, where the data network usage fees are not charged to the end users consuming the content or the particular content provider that originates the content. During this one month, end users may enjoy free access to the video service, where the free access involves being able to consume unlimited video content from the particular content provider without consuming data from the data access plan subscribed to by the end users. Also during this one month, the service provider agrees not to charge the content provider for the network usage that is related to the delivery of the content provider's video content. After the one month free period, the end users may decide to continue accessing the video streaming service albeit with having to pay data network usage fees. In this manner, the service provider can entice end users to consume more content or consume more feature rich content, thereby generating greater revenue for the service provider as a result of increased data network usage in the long term.

With reference back to FIG. 2 and upon designating (at 210) the free content, the process configures (at 220) the one or more DPI servers that perform data network usage metering to allow the designated free content to pass to end users free of charge while billing the proper content provider for the passing of such free content. The process then filters (at 230) the data network usage that is associated with the content passing through the data network based on the configuration performed at step 220 above. The filtering can be performed as the content passes through the data network or at appointed times. The filtered data network usage is then used to bill (at 240) each end user for its usage of the data network that is not related to the delivery of the designated free content and to bill each content provider for the network usage that is related to content of the content provider that has been designated as free content and that is delivered to one or more end users. In some embodiments, the billing system bills content providers at the same rate as end users for the data network usage. In some embodiments, the billing system bills content providers at a reduced rate or different rate than what end users get billed for their data network usage.

II. Data Network Integrated Solution

In some embodiments, the billing system and associated methods are implemented using existing infrastructure of the data network service provider. In some such embodiments, the billing system and associated methods are implemented using at least one DPI server of the data network. Generally, the DPI server is any server at a gateway of the data network whereby traffic entering and exiting the data network can be inspected by the DPI server. The DPI server can include different servers for different data networks. For a mobile data network, the DPI server may include the PDN GW as one example. In some embodiments, the billing system and associated methods are further implemented using a billing server of the data network. The billing server may be a separate server that is communicably coupled to the DPI server or may be implemented on the same hardware as the DPI server. Generally, the billing server is any server that performs the task of billing end users for their usage of the data network.

Figure 3:
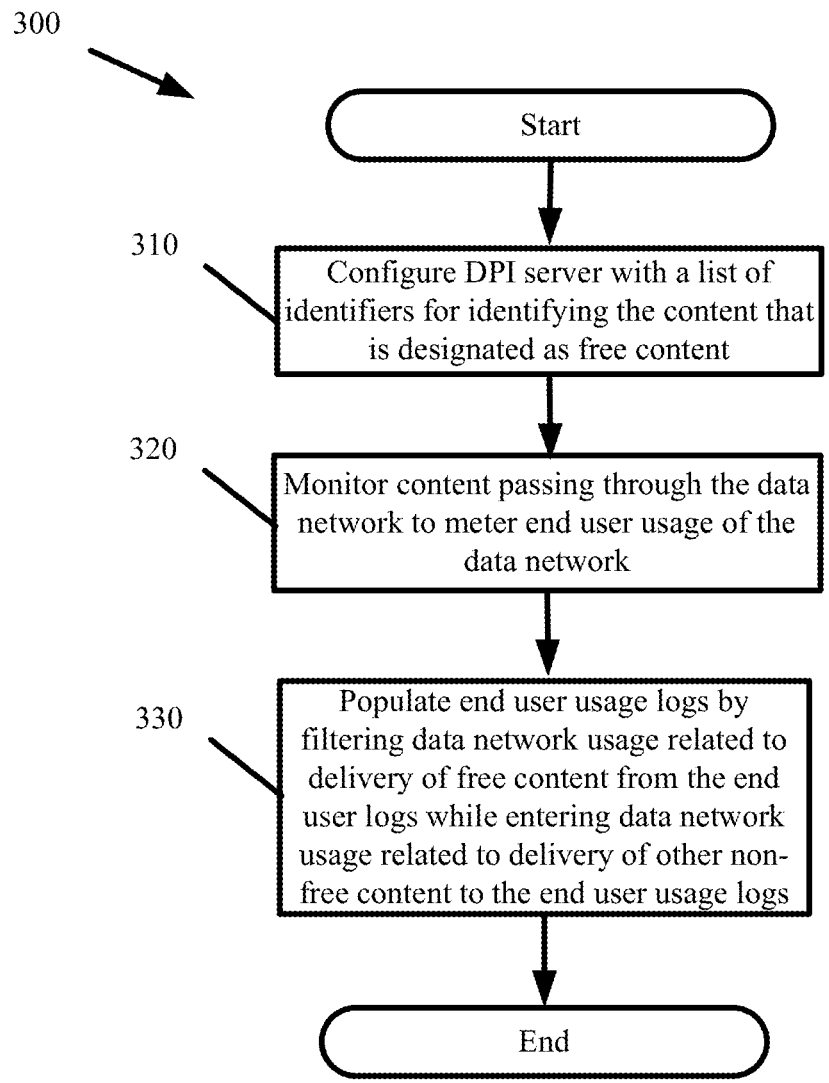
FIG. 3 presents a process describing operation of the DPI server when modified to perform data network usage filtering in accordance with some embodiments.

To implement the billing system and associated methods, the operation of the DPI server is modified in some embodiments to perform data network usage filtering in conjunction with deep packet inspection. FIG. 3 presents a process 300 describing the operation of the DPI server when modified to perform data network usage filtering in accordance with some embodiments. Specifically, the DPI server filters the data network usage that is related to the delivery of the designated free content from the end user usage logs and enters the filtered usage to the appropriate content provider usage logs. As noted above, an end user usage log is the data structure that tracks data network usage on an individual end user basis and a content provider usage log is the data structure for tracking the data network usage that is related to the delivery of select content of a particular content provider where that select content is designated as free content.

The process begins by configuring (at 310) the DPI server with a list of identifiers for identifying the content that has been designated as free content. The list of identifiers may identify one or more of 1) IP addresses, ports, IP blocks, subnets, or some combination thereof for identifying the content providers that originate or are the source of the designated free content, 2) IP addresses, ports, IP blocks, subnets, or some combination thereof for identifying a CDN that delivers designated free content on behalf of a content provider, 3) IP addresses, ports, or some combination thereof for identifying applications that run on end user devices and that are used to request and receive the designated free content, and 4) DNS records URLs, or packet header parameters for identifying the content that is designated as free content.

The process monitors (at 320) content passing through the data network to meter usage of the data network. To monitor the data network usage, the process performs DPI of the content passing through the data network. In some embodiments, the DPI involves inspection of the data packets in which the content is encapsulated. Specifically, the DPI server inspects the headers of the data packets. The inspection identifies which end users receive which content and the usage of the data network (e.g., how many bytes of data) that is related to the delivery of the content to those end users. End users are identified based on the IP addresses assigned to the devices or machines of the end users. The inspection also identifies if the data packets encapsulating the content specify one or more identifiers of the configured list of identifiers. If so, the encapsulated content is content that has been designated as free content. As such, the network usage associated with delivering that content should not be charged to the end user subscriber of the data network that receives that content.

It should be apparent to one of ordinary skill in the art that the monitoring can be performed on different bases than on an end user basis. For example, the DPI server can monitor for the designated free content on a per IP address basis, wherein two or more distinct end users may be associated with a single IP address or on a per device basis, wherein the same end user may have multiple devices that consume content using the data network.

Based on the inspection, the process populates (at 330) the end user usage logs by filtering the data network usage that is related to the delivery of the designated free content from the end user usage logs while entering the data network usage that is related to the delivery of other non-free content to the end user usage logs. In some embodiments, filtering the data network usage that is related to the delivery of the designated free content involves wholly omitting any record of that network usage from the end user usage logs. In some embodiments, filtering the data network usage that is related to the delivery of the designated free content involves entering the content that was delivered in the appropriate end user usage log and entering a value of zero for the data network usage associated with the delivery of that content.

Figure 4:
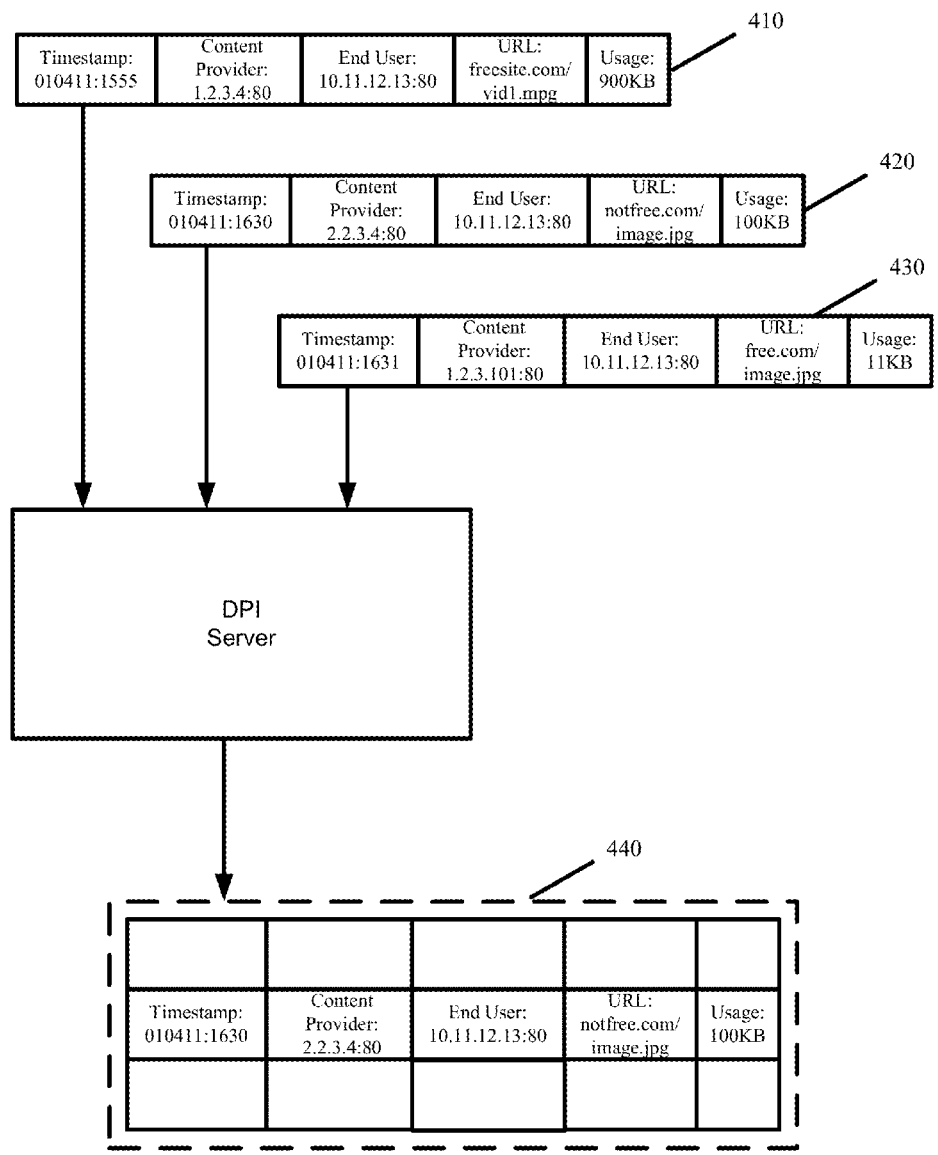
FIG. 4 illustrates filtering network usage by omitting from an end user usage log, record of network usage that is related to the delivery of designated free content.

FIG. 4 illustrates filtering network usage by omitting from an end user usage log, record of the network usage that is related to the delivery of the designated free content. FIG. 4 illustrates the data network usage that is related to the delivery of three separate items of content 410, 420, and 430. During inspection, the DPI server identifies that content 410 and 430 include one or more identifiers from the configured list of identifiers for identifying the designated free content. Accordingly, the network usage associated with delivering content 410 and 430 is filtered from the end user usage log 440 by omitting such network usage from the end user usage log 440. The figure illustrates the resulting filtered end user usage log 440 that tracks only the network usage that is related to delivery of content 420 which is not designated as free content.

Figure 5:
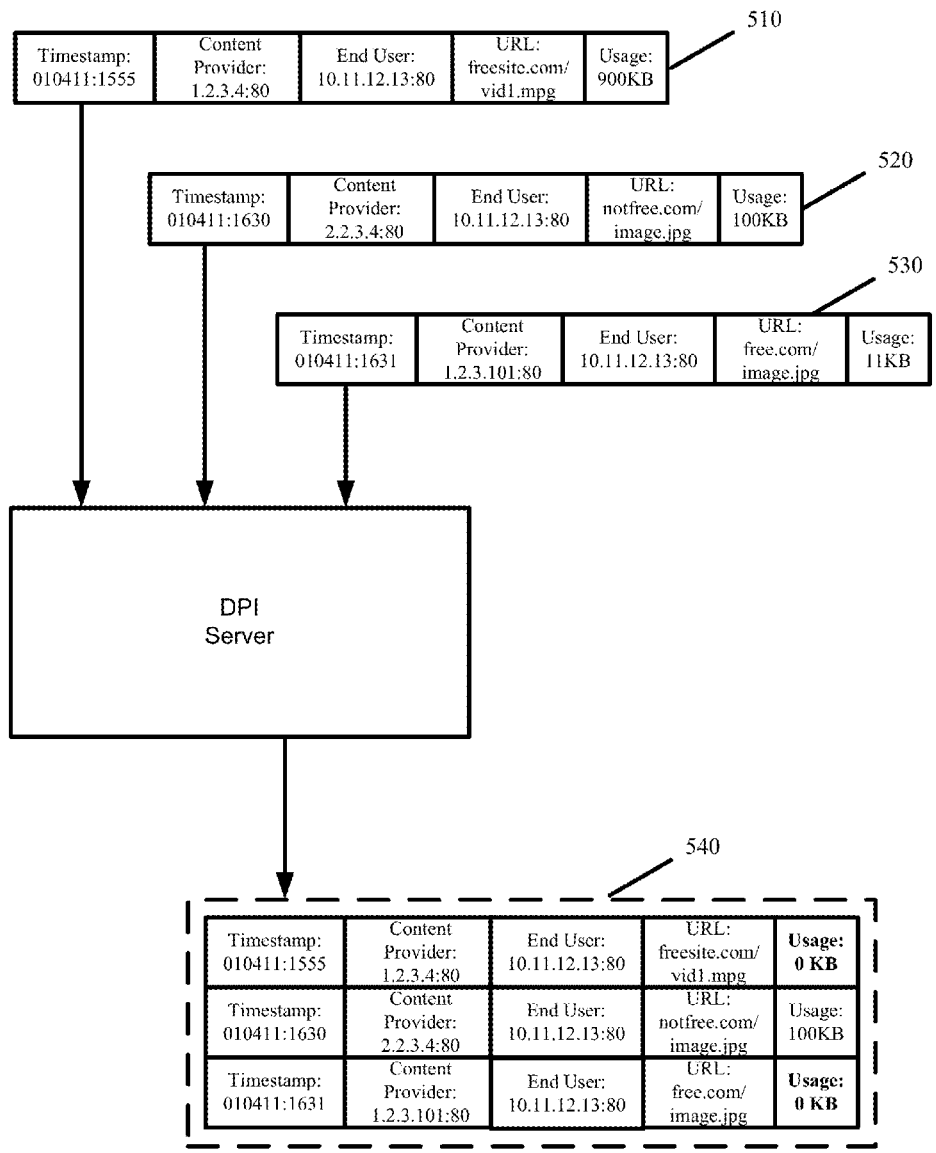
FIG. 5 illustrates filtering network usage by zeroing out network usage that is related to the delivery of designated free content from an end user usage log.

FIG. 5 illustrates filtering network usage by zeroing out the network usage that is related to the delivery of designated free content from an end user usage log. FIG. 5 illustrates the data network usage that is related to the delivery of three separate items of content 510, 520, and 530. During inspection, the DPI server identifies that content 510 and 530 include one or more identifiers from the configured list of identifiers for identifying the designated free content. Accordingly, the network usage associated with delivering content 510 and 530 is filtered from the end user usage log 540 by zeroing out such network usage from the end user usage log 440. The figure illustrates the resulting filtered end user usage log 540 that tracks each of the three items of content 510, 520, and 530, but only the network usage that is associated with content 520 is shown with a non-zero value.

In any case, the filtered end user usage logs can then be processed by a billing server. The billing server is tasked with billing end users for their usage of the data network that is not related to the delivery of the designated free content.

In some embodiments, the DPI server is further configured to generate the content provider usage logs. Content provider usage log generation may be performed in conjunction with the process 300 or as an independent process that is performed by the DPI server. In some such embodiments, the data network usage that the DPI server filters from the end user usage logs is instead entered to the appropriate content provider usage logs. During inspection, the DPI server identifies the appropriate content provider that originates or is the source for the designated free content and the data network usage that is related to the delivery of that designated free content. Such information is populated to the content provider usage log that is associated with the identified content provider. In some embodiments, the DPI server identifies the content provider that originates or is the source for the designated free content based on the source IP address and/or source port in the header of the one or more packets encapsulating the designated free content, whereby the source IP address and/or port identifies the content provider that originates or is the source of the identified designated free content. In some embodiments, the DPI server identifies the content provider that originates or is the source for the designated free content based on the URL or domain name that is in the HTTP GET request used to request the designated free content.

Figure 6:
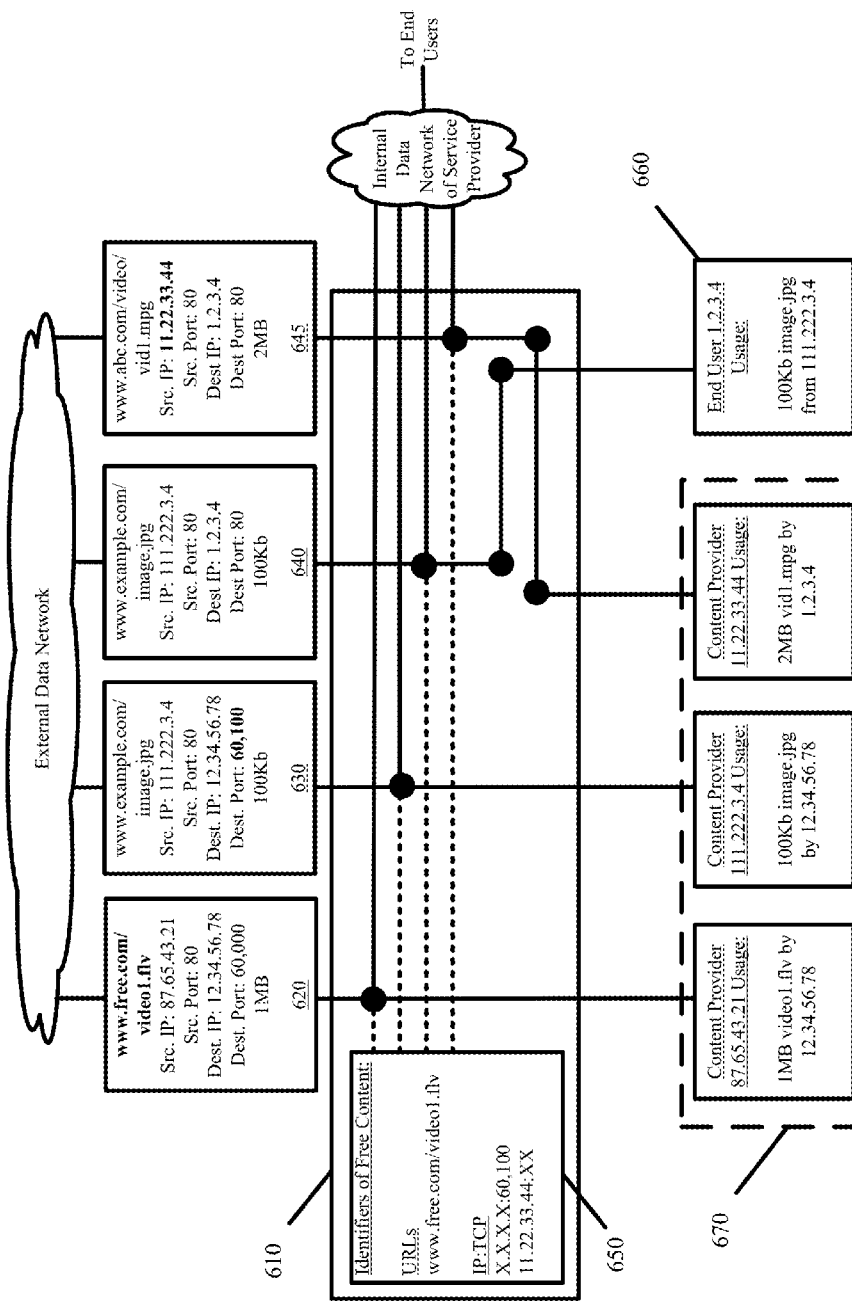
FIG. 6 conceptually illustrates a DPI server inspecting content passing through a data network and filtering the corresponding data network usage to end user usage logs and content provider usage logs in accordance with some embodiments.

FIG. 6 conceptually illustrates a DPI server 610 inspecting content passing through a data network and filtering the corresponding data network usage to end user usage logs and content provider usage logs in accordance with some embodiments. The figure illustrates 1) the DPI server 610, 2) four items of content 620, 630, 640, and 645 passing through the data network and, as a result, passing through the DPI server 610, 3) a configuration 650 of the DPI server 610 specifying a list of identifiers for identifying content that has been designated as free content, 4) end user usage log 660, and 5) content provider usage logs 670.

The first item of content 620 is passed from a source content provider that is assigned an IP address of 87.65.43.21 to a destination application that uses port 60,000 on an end user device that is assigned IP address 12.34.56.78. The first item of content 620 is identified by the URL "www.free.com/video1.flv". The DPI server 610 inspects the end user request that is used to request the first item of content 620, the response to the request containing the actual first item of content 620 that is passed back to the end user, or both. During inspection, the DPI server 610 identifies, based on the configuration 650, and more specifically based on the URL of the requested content matching to a URL that is specified in the configuration 650, that the network usage associated with delivering the first item of content 620 should not be charged to the end user, but to the content provider that is the source or that originates the first item of content 620. Consequently, the data network usage that is associated with the request and/or delivery of the first item of content 620 is filtered from the end user usage log for the end user requesting the first item of content 620. Instead, the DPI server 610 identifies the content provider that originates or is the source for the first item of content 620 and enters the data network usage that is associated with the request and delivery of the first item of content 620 to the appropriate content provider usage log 670 for that identified content provider. In some embodiments, the content provider is identified based on the configuration 650, wherein the URL matches to an entry in the configuration 650 that specifies an identifier (e.g., IP address) of the identified content provider. In some embodiments, the content provider is identified based on the addressing of the data packets used to encapsulate the first item of content 620. For example, the first item of content 620 may be encapsulated in an IP packet and the header of the IP packet includes a source address parameter that identifies the IP address of the content provider. Designating content as free content based on the URL or based on a DNS record allows content providers to designate whole domains or specific files or objects as free content.

The second item of content 630 is passed from a content provider having an IP address 111.222.3.4 to the same end user (receiving the first item of content 620) but from an application that uses port 60,100. The second item of content 630 is identified by the URL "www.example.com/image-.jpg". During inspection, the DPI server 610 identifies, based on the configuration 650, and more specifically based on the port of the requesting/receiving application matching to a port specified in the configuration 650, that the network usage associated with delivering the second item of content 630 should not be charged to the end user, but to the content provider that is the source or that originates the second item of content 630. Consequently, the DPI server 610 filters the data network usage that is associated with delivering the second item of content 630 from the end user usage log of the end user that receives the second item of content 630. Instead, the DPI server 610 identifies the content provider that originates or is the source for the second item of content 630 and enters the data network usage that is associated with the request and delivery of the second item of content 630 to the appropriate content provider usage log 670 for that identified content provider. Designating content as free content based on the IP address and/or port of the end user device or receiving application allows content providers to develop special applications that end users can run on their devices in order to receive free content. The end users can be assured that any content accessed using the specific application will not incur network usage fees. It should be apparent that such an application can be used to access free content from different content providers irrespective of whether the content providers are assigned different addressing, so long as the application requesting and receiving the content uses the port that is specified in the configuration 650 as one for receiving free content.

The third item of content 640 is passed from the content provider having an IP address 111.222.3.4 to an end user that is assigned IP address 1.2.3.4. The third item of content 640 is identified by the URL "www.example.com/image.jpg". During inspection, the DPI server 610 identifies the content 640 as billable content. Unlike the second item of content 630, the network usage for the third item of content 640 is billable to the requesting and receiving end user even though the content being delivered is the same as the content delivered in the above example for the second item of content 630. In this figure, the network usage associated with delivering the second item of content 630 is not billable to the end user because the second item of content 630 is requested and received by an application that is provided access to the content without incurring data network usage fees (identified by port 60,100 in the configuration 650). However, the network usage associated with delivering the third item of content 640 is billable to the end user because the third item of content 640 is requested and received using a different application (e.g., a generic browser using port 80) that the service provider has not specified in the configuration 650 as one that receives content without incurring network usage fees. Moreover, the third item of content 640 and the source from which the third item of content 640 is passed are also not identified in the configuration 650 as content or a source that do not incur network usage fees. Accordingly, the DPI server 610 enters the 100 kilobytes of data network for delivering the third item of content 640 (i.e., image.jpg) to the corresponding end user usage log 660 for the end user having IP address 1.2.3.4. The data network usage that is related to the delivery of the third item of content 640 is not entered to the content provider usage logs 670.

The fourth item of content 645 is passed from a content provider having IP address 11.22.33.44 to the end user that is assigned IP address 1.2.3.4. The fourth item of content 645 is identified by the URL "www.abc.com/video/vid1.mpg". During inspection, the DPI server 610 identifies, based on the configuration 650, and more specifically based on the source IP address of the content provider matching to an IP address that is specified in the configuration 650, that the network usage associated with the delivery of the fourth item of content 645 should not be charged to the end user, but to the content provider that is the source or that originates the fourth item of content 645. Consequently, the DPI server 610 filters the data network usage that is associated with delivering the fourth item of content 645 from the end user usage logs. Instead, the DPI server 610 identifies the content provider that originates or is the source for the fourth item of content 645 and enters the data network usage that is associated with the request and delivery of the fourth item of content 645 to the appropriate content provider usage log 670 for that identified content provider. Filtering based on the source IP address and/or source port of the content provider allows some or all content of the content provider to be designated as free content. It should be noted that the source IP address header field in a packet encapsulating content that is sent from a content provider to an end user can be used to identify the content provider, whereas the destination IP address header field in a request for content that is sent from an end user to a content provider can be used to identify the content provider.

With reference to FIG. 6 above, the designated free content is identified based on a single identifier whether the URL, destination port, or source IP address. In some embodiments, the DPI server may be configured to identify the designated free content based on two or more identifiers. For example, content that is sent from a particular source IP address and that has a particular file name is designated as free content, whereas content that is sent from a different IP address but that has the same file name is not designated as free content. This allows for more granularity is designating the free content.

Also with reference to FIG. 6 above, the filtering is performed on-the-fly as content passes through the DPI server of the data network service provider. Such a billing method is referred to herein as on-the-fly filtering. In addition to or instead of on-the-fly filtering, some embodiments perform delayed filtered, whereby the filtering of data network usage that is related to the delivery of the designated free content is performed at appointed times. In some such embodiments, the DPI server tracks all data network usage to end user usage logs as would be done in a typical scenario of metering end user usage of a data network. Then at an appointed time, the DPI server filters the end user usage logs to remove or zero out the network usage that is related to the delivery of content that is designated as free content. The appointed time may include a time when the service provider performs billing to determine how much to bill end users based on their usage of the data network. For example, the DPI server may perform delayed filtering at the end of each month or whenever a billing cycle for an end user subscriber is to end.

It should be apparent that in some delayed filtering embodiments, the DPI server tracks all data network usage to a single master usage log. Then at the appointed time, the DPI server filter the master usage log to produce the filtered end user logs that do not include the network usage that is related to the delivery of the content that is designated as free content and to produce the content provider usage logs that include the network usage that is related to the delivery of the content that is designated as free content.

Figure 7:
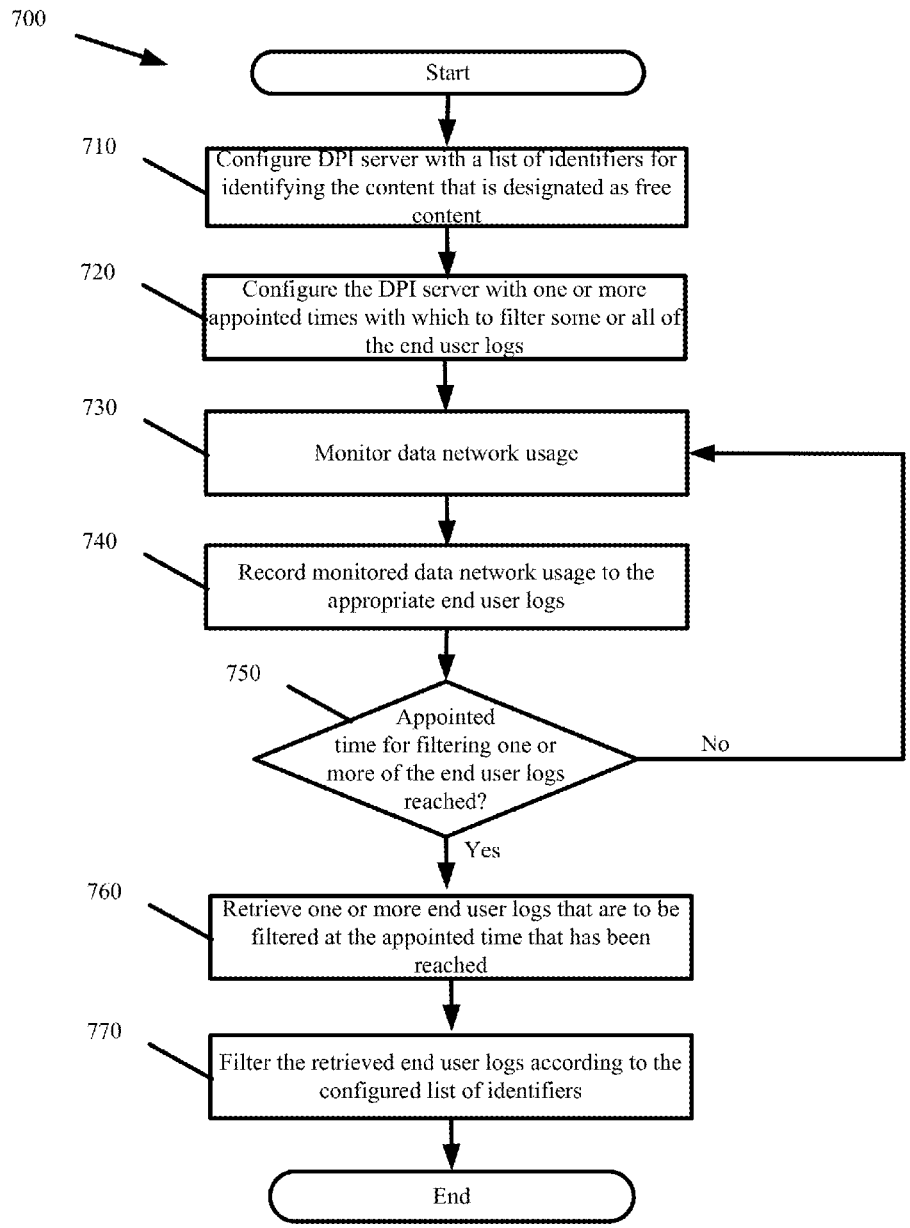
FIG. 7 presents a process that is performed by the DPI server to perform delayed filtering in accordance with some embodiments.

FIG. 7 presents a process 700 that is performed by the DPI server to perform delayed filtering in accordance with some embodiments. The process begins by configuring (at 710) the DPI server with a list of identifiers for identifying the content that is designated as free content. As described above, this may include configuring the DPI server with one or more IP addresses, port numbers, IP blocks, subnets, or some combination thereof to identify the designated free content. Additionally, this may include configuring the DPI server with one or more DNS records, URLs, or domain names to identify the designated free content. The process further includes configuring (at 720) the DPI server with one or more appointed times with which to filter some or all of the end user usage logs. For example, a first appointed time may occur when a billing cycle (e.g., monthly billing cycle) for some but not all end user subscribers occurs on the third day of each month and a second appointed time may occur when the billing for a different set of end user subscribers occurs on the eighth day of each month.

The process monitors (at 730) data network usage for content that is requested by and delivered to end user subscribers of a data network service provider operating the DPI server. The process records (at 740) such data network usage to the appropriate end user usage logs. In some embodiments, the data network usage is instead recorded to a master usage log that is later partitioned to produce the end user usage logs.

While tracking and recording the data network usage, the process determines (at 750) if one or more of the appointed times for filtering one or more of the end user usage logs is reached. If not, the process reverts to step 730 and continues to track and record data network usage to the end user usage logs. However when an appointed time is reached, the process retrieves (at 760) the one or more end user usage logs that are to be filtered at that appointed time. Retrieving the end user usage logs may include selectively retrieving only those end user usage logs that are to be filtered at the particular appointed time that is reached, while other end user usage logs are not retrieved. As noted above, this may occur when the end of a billing cycle for different end users falls on different dates. Alternatively, all end user usage logs may be retrieved all at once. In some embodiments, retrieving the end user usage logs may include (1) taking a snapshot copy of the end user usage logs as they exist and then subsequently appending additional network usage to the logs after the snapshot is taken, (2) temporarily locking the end user usage logs from further modification, or (3) retrieving the current set of end user usage logs and appending additional data network usage to a new set of end user usage logs.

The process filters (at 770) the retrieved end user usage logs according to the configured list of identifiers. Filtering involves processing at least one retrieved end user usage log to identify data network usage that is related to the designated free content and to zero out or remove such identified usage from the end user usage log. Filtering may further involve producing the content provider usage logs based on the network usage that is filtered from the end user usage logs. The process can continue by reverting back to step 730 or terminate once all retrieved end user usage logs are filtered.

Process 700 is described above with reference to the DPI server. However, it should be apparent to one of ordinary skill in the art that part of the process may be offloaded to a billing server of the data network that works in conjunction with the DPI server. For instance at 710, the billing server may be configured with the list of identifiers and at step 760, the billing server retrieves the end user usage logs that are to be filtered at the appointed time from the DPI server and the billing server performs the filtering at step 770 based on the configured list of identifiers.

Figure 8:
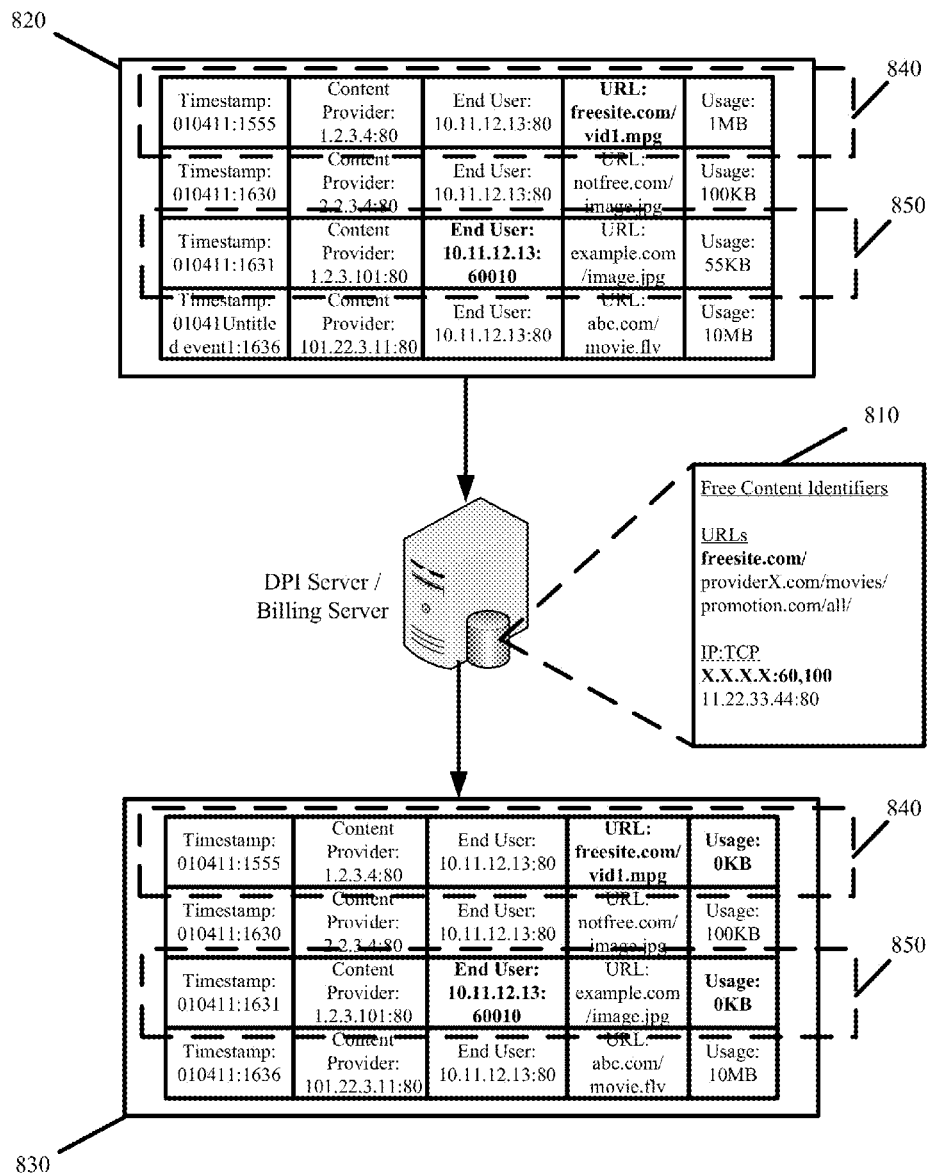
FIG. 8 conceptually illustrates performing delayed filtering in accordance with some embodiments.

FIG. 8 conceptually illustrates performing delayed filtering in accordance with some embodiments. The figure includes a configuration 810, a first state 820 for an end user usage log, and a second state 830 for the end user usage log. The configuration 810 specifies the list of identifiers for identifying content that is designated as free content and for identifying network usage that is not billable to the end user. The first state 820 for the end user usage log identifies the data network usage that is recorded to the end user usage log prior to the end user usage log being filtered by a DPI server or a billing server of some embodiments. The second state 830 for the end user usage log identifies the data network usage that is recorded to the end user usage log after the end user usage log has been filtered by the DPI server or billing server using the identifiers listed in the configuration 810.

The first state 820 of the end user usage log illustrates that the end user (represented by the end user usage log) used the data network to download four separate items of content. The network usage associated with the delivery of each item of content of the four items of content is recorded to the first state 820 to the end user usage log. More specifically, the end user usage log records a timestamp for when a particular item of content was delivered, the source and destination addressing for each item of content, the URL for each item of content, and the data network usage that is related to the delivery of each item of content. It should be apparent that end user usage logs may include more or less information to detail the usage of the data network and that the filtering can be adapted to filter such information from the end user usage logs.

At an appointed time, the DPI server or billing server that is configured with the list of identifiers (see configuration 810) retrieves the first state 820 of the end user usage log and filters the end user usage log according to the list of identifiers presented in the configuration 810. As shown, two of the four items of content (see 840 and 850) in the end user usage log have identifiers that match one or more identifiers in the configuration 810. The matching indicates that the content represented by entries 840 and 850 is free content and that the corresponding data network usage for delivering the free content to the end user should not be billed to the end user. Accordingly, the DPI server or billing server filters such network usage from the end user usage log to produce the second state 830 of the end user usage log. The second state 830 of the end user usage log illustrates the end user usage log after the data network usage for the two items of free content 840 and 850 have been filtered from the end user usage log. As shown, the amount of data network usage associated with the identified free content 840 and 850 is zeroed out. In so doing, the end user that is associated with the end user usage log presented in FIG. 8 will not be billed for the data network usage that is related to the delivery of the designated free content (content represented by entries 840 and 850).

Figure 9:
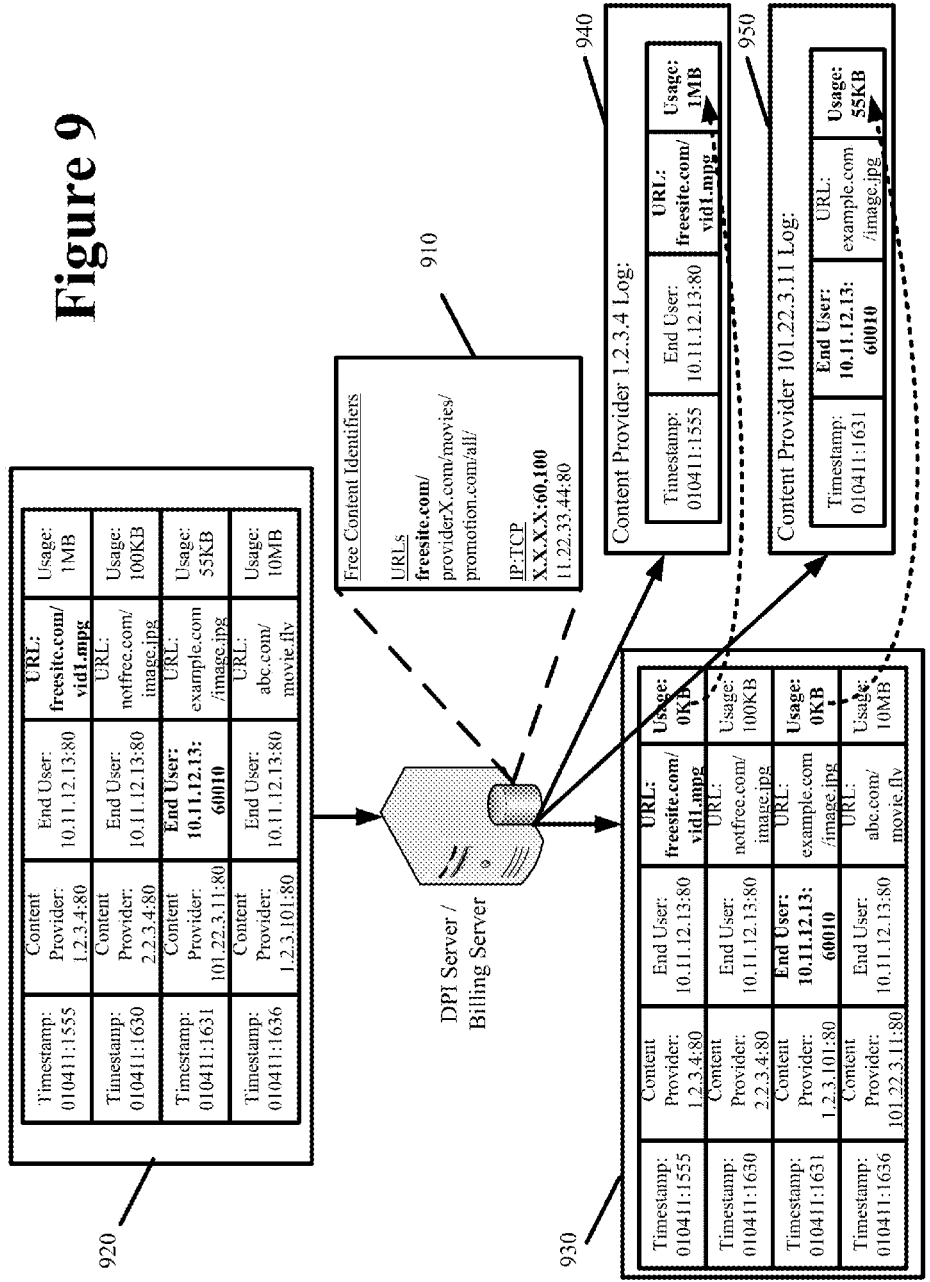
FIG. 9 conceptually illustrates the DPI server performing delayed filtering in which the data network usage that is related to the delivery of the designated free content is zeroed out from the end user usage logs and is entered in the appropriate content provider usage logs.

In some embodiments, the DPI server or billing server is further configured to generate the content provider usage logs when performing the delayed filtered that is illustrated with reference to FIGS. 7 and 8 above. These steps may be performed in conjunction with the process 700 or as a separate process. FIG. 9 conceptually illustrates the DPI server performing delayed filtering in which the data network usage that is related to the delivery of the designated free content is zeroed out from the end user usage logs and is entered in the appropriate content provider usage logs.

FIG. 9 is similar to FIG. 8 and illustrates a configuration for identifying designated free content 910, an end user usage log prior to filtering 920, and the end user usage log after filtering 930. The figure is modified to further include content provider usage logs 940 and 950. Specifically, when the DPI server or billing server performs delayed filtering of the end user usage log, the data network usage that is related to the delivery of free content is zeroed out from the end user usage log as described above with reference to FIG. 8. Additionally, the DPI server or billing server transfers the data network usage that is related to the delivery of free content from the end user usage logs to the appropriate content provider usage logs. In this example, the appropriate content provider usage log is identified based on an IP address identifier that is associated with the data network usage. As shown, the data network usage that is related to the delivery of "freesite.com/vid1.mpg" from the content provider with IP address 1.2.3.4 to the end user with IP address 10.11.12.13 is identified as free content. This network usage is zeroed out from the filtered end user usage log 930 and is entered to the content provider usage log 940 for the content provider with IP address 1.2.3.4. Similarly, the data network usage that is related to the delivery of "example.com/image.jpg" from the content provider with IP address 101.22.3.11 to the end user with IP address 10.11.12.13 is identified as free content. This network usage is zeroed out from the end user usage log 930 and is entered to the content provider usage log 950 for the content provider with IP address 101.22.3.11.

Instead of the filtering performed at step 770 and instead of the filtering that is illustrated in FIGS. 8 and 9, some embodiments instead process the end user usage logs to identify the network usage that is attributable to the end users and to the content providers. Processing can be performed without zeroing or removing entries of the end user usage logs and without the need to generate the content provider usage logs. In some embodiments, processing involves classifying the network usage that is tracked to the end user usage logs as end user billable network usage and content provider billable network usage. End user billable network usage identifies the network usage that is not related to the delivery of designated free content and that should be charged against end users. Content provider billable network usage identifies the network usage that is related to the delivery of designated free content and that should be charged against the content providers that originate or are otherwise the source for such content. To classify the network usage, some embodiments tag entries in the end user usage logs as end user billable or content provider billable such that the logs need not be filtered and separate content provider logs need not be generated.

Figure 10:
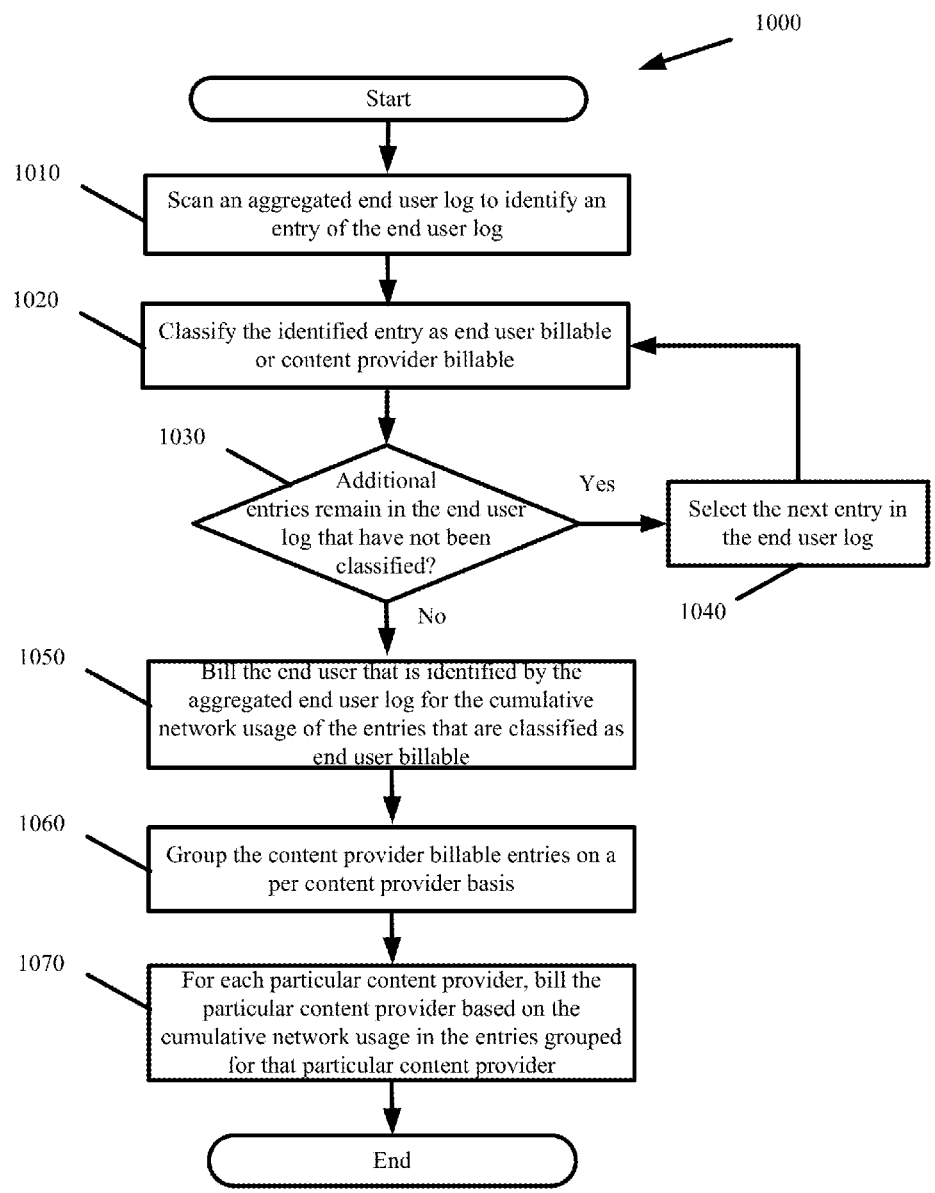
FIG. 10 presents a process for performing delayed filtering by processing the end user usage logs in accordance with some embodiments.

FIG. 10 presents a process 1000 for performing delayed filtering by processing the end user usage logs in accordance with some embodiments. The process 1000 may begin after performing steps 710-760 of FIG. 7 such that at least one end user usage log is aggregated from the DPI server and each aggregated end user usage log tracks network usage by a different end user irrespective of whether the network usage is related to the delivery of designated free content or not.

The process 1000 involves scanning (at 1010) an aggregated end user usage log to identify an entry of the end user usage log. Each identified entry tracks the network usage for each instance of content that is delivered over the data network. Each entry may further record parameters for identifying the source from which an instance of content is delivered and the destination that received that instance of content.

The process classifies (at 1020) the identified entry as end user billable or content provider billable. An end user billable entry is one that tracks network usage that is related to the delivery of content that has not been designated as free content. A content provider billable entry is one that tracks network usage that is related to the delivery of content that has been designated as free content. The process classifies the identified entry by determining whether the identified entry has an identifier that matches to an identifier of the list of identifiers used to identify the content that is designated as free content. In some embodiments, classifying the identified entry may include tagging the entry with metadata or one or more other identifiers designated the classification of the identified entry. In some embodiments, classifying the identified entry may include copying the entry to a first data structure that stores entries classified as end user billable or to a second data structure that stores entries classified as content provider billable.

The process determines (at 1030) if additional entries remain in the end user usage log that have not been classified. If so, the process selects (at 1040) the next entry and reverts to step 1020. Otherwise, the process bills (at 1050) the end user based on the cumulative network usage of the entries that are classified as end user billable. The process groups (at 1060) the content provider billable entries on a per content provider basis. In so doing, the process identifies all the entries from the end user usage log that identify content originated by a specific content provider and content that has been designated as free content. Then for each particular content provider, the process bills (at 1070) the particular content provider based on the cumulative network usage in the entries grouped for that particular content provider.

III. CDN Solution

In some embodiments, the billing system and associated methods are implemented using components of a data network that are operated by a service provider and those of a third party partner. The third party partner preferably includes a content delivery network (CDN) that partners with the data network service provider to offer accelerated content delivery for the end user subscribers of the data network. Implementing the billing system and associated methods of some embodiments with such an integrated architecture may be preferred by some service providers because it removes much of the configuration and tracking overhead from the service provider. Specifically, the service provider monitors end user usage of the data network in order to generate end user usage logs. The service provider, however, can rely on the CDN to track data network usage that is related to the delivery of the designated free content and to record such usage in server logs. The logs can then be combined and processed to bill end users for their usage of the data network without fees related to the request and delivery of designated free content and to bill content providers for the request and delivery of the designated free content.

Figure 11:
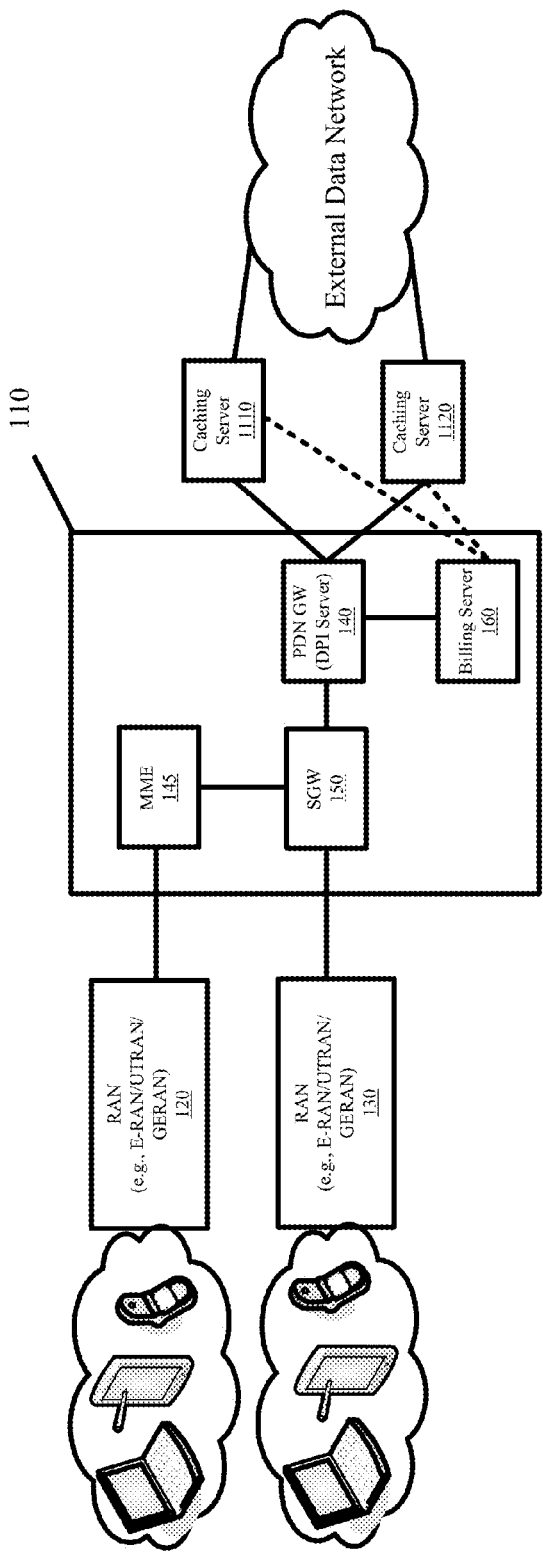
FIG. 11 presents an exemplary data network architecture that is integrated with components of a CDN.

FIG. 11 presents an exemplary data network architecture that is integrated with components of a CDN. In FIG. 11, the data network includes the same architectural components 110-160 as those described with reference to FIG. 1 above. Additionally, a pair of CDN caching servers 1110 and 1120 is located in between the PDN GW 140 and the external data network. The CDN caching servers 1110 and 1120 are preferably under the control of the CDN, though partnerships between the data network service provider and the CDN can blur the line as to which entity controls and operates the CDN caching servers 1110 and 1120. Additionally, the data network service provider may deploy the caching servers 1110 and 1120 for the performance and bandwidth savings that the data network service provider realizes when caching and serving content from the caching server 1110 and 1120 instead of servers that are located in the external data network. Specifically, The CDN caching servers 1110 and 1120 are located at the point in which content enters the service provider data network from an external data network and content exits the service provider data network to an external data network. The CDN caching servers 1110 and 1120 accelerate the delivery of content to the end users of the data network by caching certain content at a geographic location that is proximate to the data network and by delivering that content from the geographically proximate location rather than the longer distance often required to deliver content from servers of the source content provider. The reduced distance that the content has to travel results in a better end user experience as content is delivered to the end user with less latency, packet loss, etc. Additionally, the CDN caching servers 1110 and 1120 provide cost savings to the data network service provider, because more content can be delivered without accessing the external data network, thereby resulting in reduced usage of the external data network that the service provider may otherwise have to pay for. Other components of the CDN are not shown for purposes of simplicity. However, it should be apparent to one of ordinary skill in the art that the CDN may operate various other caching servers, traffic management servers, administrative servers, and other billing servers independent of the data network service provider.

In some embodiments, the CDN caching servers 1110 and 1120 are configured to exclusively cache and serve the designated free content to the end user subscribers of the data network. For instance, each of the caching servers 1110 and 1120 may be preloaded with the content that has been designated as free content and requests for such content are redirected or forwarded to the caching server 1110 and 1120 instead of the servers of the source content providers. In some other embodiments, the CDN caching servers 1110 and 1120 are configured to cache serve the designated free content in addition to other content.

In some embodiments, the billing system can be adapted to perform on-the-fly filtering in the integrated framework of FIG. 11 or some similar integrated framework whereby components of the CDN are integrated with a data network. In such a billing system implementation, the operation of the DPI server is similar to that described with reference to FIG. 3 above. Specifically, the DPI server monitors content passing through the data network to generate and populate end user usage logs with the data network usage that is related to the delivery of content that is not designated as free content. The caching servers of the CDN are then used to track the network usage that is related to the delivery of the designated free content. The billing server aggregates the end user usage logs and the caching server logs to then bill the end users and content providers properly.

Figure 12:
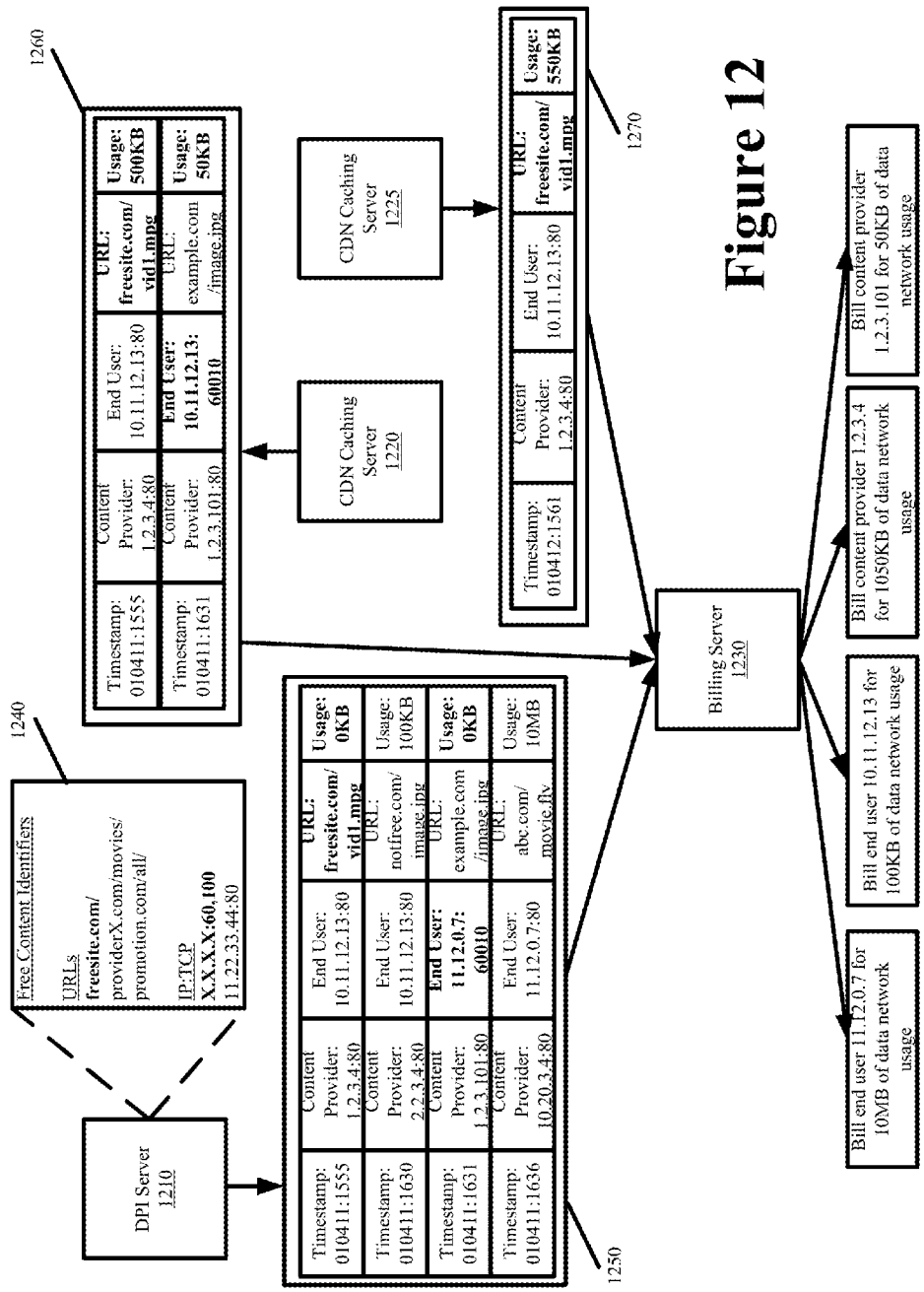
FIG. 12 illustrates operation of the billing system when performing on-the-fly filtering in an integrated framework in accordance with some embodiments.

FIG. 12 illustrates operation of the billing system when performing on-the-fly filtering in an integrated framework in accordance with some embodiments. The figure illustrates a DPI server 1210, a first caching server 1220, a second caching server 1225, and a billing server 1230.

When performing on-the-fly filtering, the DPI server 1210 is configured with a list of identifiers 1240 for identifying the content that has been designated as free content. The DPI server 1210 performs a deep packet inspection of the content passing through the data network. As before, the inspection involves monitoring the data network usage on a per end user basis and entering the usage to the appropriate end user usage logs 1250. Based on the configured list of identifiers 1240, the DPI server 1210 filters from the end user usage logs 1250, the data network usage that is related to the delivery of designated free content while entering the data network usage that is related to the delivery of content that is not designated as free content. Filtering may include omitting entry or zeroing out entry of the data network usage that is related to the delivery of the designated free content.

As shown, the end user usage logs 1250 record the data network usage for two separate end users having two different IP addresses. The end user usage logs 1250 track the data network usage for each of the two end users with the usage that is related to the delivery of the designated free content being zeroed out.

Each of the caching servers 1220 and 1225 is configured to serve content that has been designated as free content. Each of the caching servers 1220 and 1225 may also be configured to serve other content that is not designated as free content for the purpose of accelerating the delivery of that content to data network end users that are more geographically proximate to one of the caching servers 1220 and 1225 than origin servers or other servers of content providers that host the same content. Whenever a request for the designated free content is sent from an end user subscriber of the data network, the request is routed to one of the caching servers 1220 and 1225. Load balancing may be used to balance the load on each of the caching servers 1220 and 1225. Various techniques that are well established in the art can be used to route the requests for the designated free content to the caching servers 1220 and 1225 instead of the servers of the content providers that originate or are the source for the designated free content. For example, the DNS records for the authoritative DNS servers of the data network are rewritten such that a request for designated free content is resolved to one of the caching servers 1220 and 1225 instead of the content provider that originates or is the source of the requested content. As another example, hyperlinks to embedded objects of an HTML page that have been designated as free content may be rewritten in the base HTML page to resolve to one of the caching servers 1220 and 1225 instead of a server of the corresponding content provider. If content hosted by one of the caching servers 1220 and 1225 is not cached at the caching server, the caching server is configured to retrieve the content from the content provider, serve the retrieved content to the requesting end user, and cache the content to satisfy subsequent requests for the content from cache.

In some embodiments, the caching servers 1220 and 1225 operate as proxies. In some such embodiments, the caching servers 1220 and 1225 receive requests for all content, but the caching servers 1220 and 1225 serve the requested content from cache when the request is for the designated free content.

Each caching server 1220 and 1225 logs network usage that is associated with the content that it delivers. Specifically, the caching servers 1220 and 1225 log at least one identifier to identify the served content and the network usage that is associated with that content being served. The logged identifiers and network usage are entered into a server log. As shown, the caching server 1220 populates a first server log 1260 that identifies the network usage that is related to the delivery of two items of content, wherein the two items of content have been designated as free content and have been delivered by the caching server 1220. The caching server 1225 populates a second server log 1270 that identifies the network usage that is related to the delivery of a single item of content that is designated as free content and that has been delivered by the caching server 1225.

In some embodiments, each caching server 1220 and 1225 may be configured to populate two server logs, wherein a first server log tracks the network usage that is related to the delivery of the designated free content and the second server log tracks the network usage that is related to the delivery of content that is not designated as free content. In some such embodiments, the caching servers 1220 and 1225 may be configured with a list of identifiers such that the network usage that is related to the delivery of the designated free content can be distinguished from other network usage. In so doing, the network usage that is related to the delivery of the designated free content can be entered to the illustrated server logs 1260 and 1270, while the network usage that is related to the delivery of content that is not designated as free content can be entered to a different set of logs.

At the time of billing, the billing server 1230 aggregates the end user usage logs 1250 from the DPI server 1210 and the server logs 1260 and 1270 from the caching servers 1220 and 1225. Since the end user usage logs 1250 have been filtered to include only data network usage that is related to the delivery of content that is not designated as free content, the billing server 1230 processes the end user usage logs 1250 to bill the end users for such usage. This includes summing the total data network usage on a per end user basis and billing each end user based the end user's respective total network usage. The billing server 1230 performs similar processing of the server logs 1260 and 1270 to bill the corresponding content providers for the data network usage that is related to the delivery of their content that is designated as free content. Specifically, the billing server 1230 parses the server logs 1260 and 1270 to sum the data network usage that is related to the delivery of the designated free content for each content provider. The billing server 1230 then bills each content provider accordingly for the summed usage. When the aggregated server logs are intermixed with data network relating to the delivery of the designated free content and other content, the billing server 1230 is configured with a list of identifiers to filter the usage to identify only the usage relating to the designated free content and thereafter bill the content providers accordingly. However, when the aggregated server logs track usage relating only to the delivery of the designated free content, then the billing server 1230 can process the server logs without filtering.

In some embodiments, the billing server 1230 may be comprised of one or more billing servers that perform the data network usage billing. In some embodiments, the data network service provider operates a billing server independent of a billing server that is operated by the CDN. The data network billing server bills end users for their usage of the data network based on the filtered end user usage logs. The CDN billing server bills content providers for their usage of the data network based on the caching server logs and the metered usage related to the delivery of the designated free content. In some embodiments, the service provider operates a centralized billing server for billing of end users and content providers. In still some other embodiments, the CDN operates a centralized billing server to perform the end user billing and the content provider billing.

In some embodiments, the billing system can be adapted to perform delayed filtering in an integrated framework. In such a billing system implementation, the DPI populates the end user usage logs with all end user data network usage regardless of whether the usage is related to the delivery of the designated free content or not. Accordingly, the operation of the DPI server is unmodified from its ordinary operation in a typical service provider data network that does not distinguish between the designated free content and other content. Similarly in such a billing system implementation, the caching servers generate and populate server logs with the network usage that is related to any content delivered from the caching servers to various end users. The operation of the caching servers is also unmodified from their ordinary operation in a typical CDN. In this delayed filtering integrated framework, the billing server is tasked with aggregating and filtering or processing the end user usage logs from the DPI server and the server logs from the CDN caching servers. The billing server filters or processes the aggregated logs to bill end users for their usage of the data network relating to the delivery of content that is designated as free content and to bill each particular content provider for the end user data network usage relating to the delivery of content of the particular content provider that is designated as free content.

Figure 13:
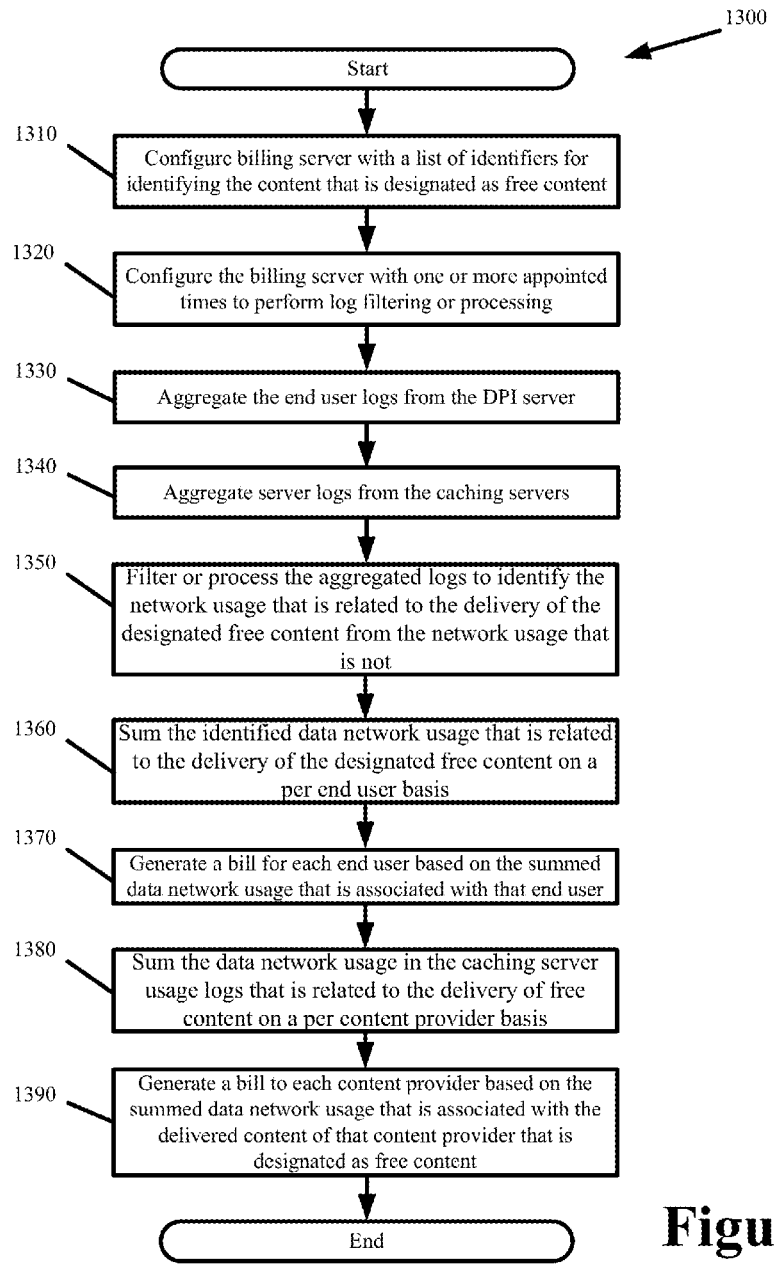
FIG. 13 presents a process performed by the billing server in an integrated framework whereby delayed filtering is performed in accordance with some embodiments.

FIG. 13 presents a process 1300 performed by the billing server in an integrated framework whereby delayed filtering is performed in accordance with some embodiments. The process 1300 begins by configuring (at 1310) the billing server with a list of identifiers for identifying the content that is designated as free content. The process further involves configuring the billing server (at 1320) with one or more appointed times to perform log filtering or log processing as part of end user and content provider billing.

The process aggregates (at 1330) the end user usage logs from the DPI server. The process also aggregates (at 1340) the server logs from the caching servers of the CDN. In some embodiments, the billing server is configured with the addressing and login parameters necessary to communicably couple to the DPI server and the CDN caching servers in order to aggregate the logs from those servers. Any networking protocol or file transfer protocol that is supported by each of the billing server, DPI server, and CDN caching servers may be used to facilitate the log aggregation performed at steps 1330 and 1340.

Next, the process filters or processes (at 1350) the aggregated logs to identify the network usage that is related to the delivery of the designated free content from the network usage that is not related to the delivery of the designated free content. When filtering the aggregated end user usage logs, the process removes or zeros out the network usage that is entered in the end user usage logs and that is related to the delivery of the designated free content. When filtering the aggregated caching server usage logs, the process removes or zeros out the network usage that is entered in the caching server usage log and that is related to the delivery of content that is not designated as free content. When processing the end user usage logs, the process identifies or otherwise distinguishes the network usage that is entered in the end user usage logs and that is related to the delivery of content that is not designated as free content. When processing the aggregated caching server usage logs, the process identifiers or otherwise distinguishes the network usage that is entered in the caching server usage logs that is related to the delivery of the designated free content.

The process sums (at 1360) the identified data network usage in the end user usage logs that is related to the delivery of the designated free content on a per end user basis. The summed usage is then used to generate (at 1370) a bill to each end user.

The process also sums (at 1380) the data network usage in the caching server usage logs that is related to the delivery of free content on a per content provider basis. This summed usage is then used to generate (at 1390) a bill to each content provider based on the summed data network usage that is associated with the delivered content of that content provider that is designated as free content.

IV. Server System

Many of the above-described processes and components are implemented as software processes that are specified as a set of instructions recorded on non-transitory computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense and may include any electronic device with a processor that executes instructions stored on computer readable media or that are obtained remotely over a network connection. Examples of computer readable media include, but are not limited to, CD-ROMs, flash drives, RAM chips, hard drives, EPROMs, etc. Further, wherever a server is identified as a component of the embodied invention, it is understood that the server may be a single physical machine, or a cluster of multiple physical machines performing related functions, or virtualized servers co-resident on a single physical machine, or various combinations of the above.

Figure 14:
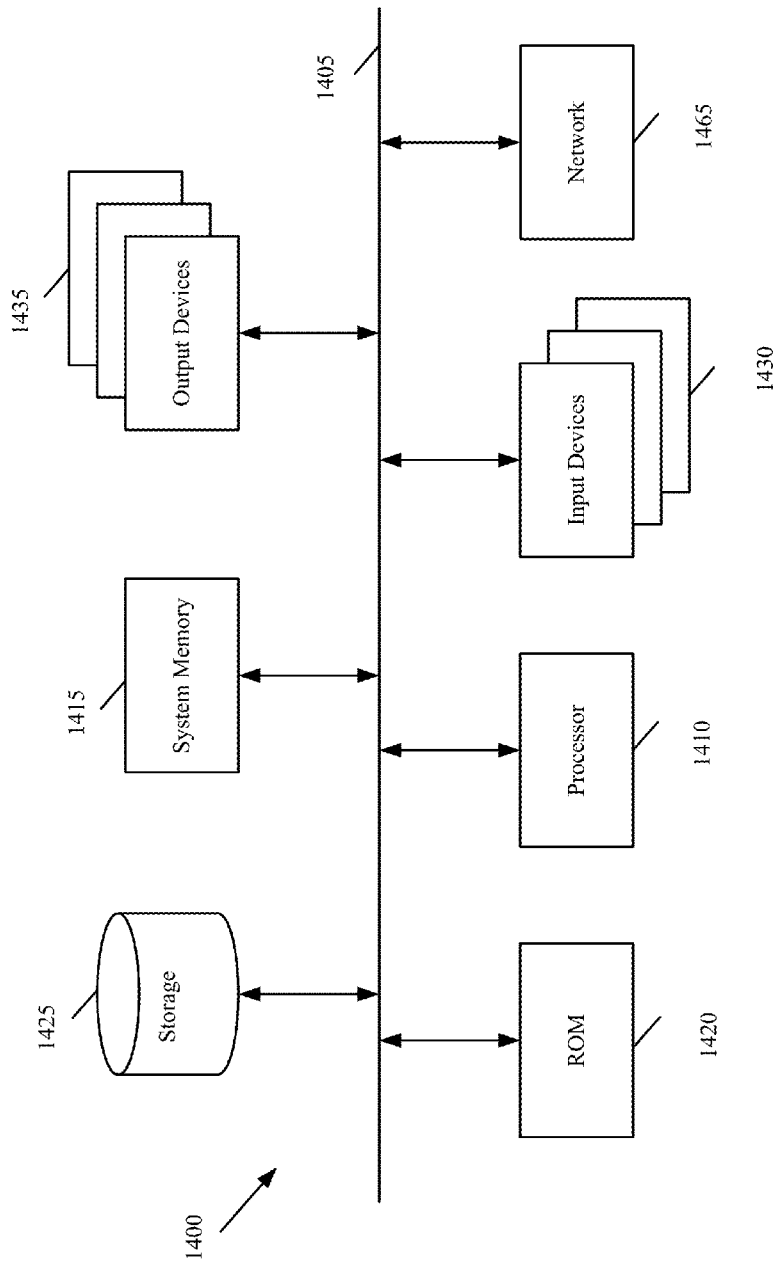
FIG. 14 illustrates a computer system or server with which some embodiments are implemented.

FIG. 14 illustrates a computer system or server with which some embodiments are implemented. Such a computer system includes various types of computer readable mediums and interfaces for various other types of computer-readable mediums that implement the processes for the billing system described above (e.g., the DPI server and the billing server). Computer system 1400 includes a bus 1405, a processor 1410, a system memory 1415, a read-only memory 1420, a permanent storage device 1425, input devices 1430, and output devices 1435.

The bus 1405 collectively represents all system, peripheral, and chipset buses that communicatively connect the numerous internal devices of the computer system 1400. For instance, the bus 1405 communicatively connects the processor 1410 with the read-only memory 1420, the system memory 1415, and the permanent storage device 1425. From these various memory units, the processor 1410 retrieves instructions to execute and data to process in order to execute the processes of the invention. The processor 1410 is a processing device such as a central processing unit, integrated circuit, graphical processing unit, etc.

The read-only-memory (ROM) 1420 stores static data and instructions that are needed by the processor 1410 and other modules of the computer system. The permanent storage device 1425, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1425.

Other embodiments use a removable storage device (such as a flash drive) as the permanent storage device Like the permanent storage device 1425, the system memory 1415 is a read-and-write memory device. However, unlike the storage device 1425, the system memory is a volatile read-and-write memory, such as random access memory (RAM). The system memory stores some of the instructions and data that the processor needs at runtime. In some embodiments, the processes are stored in the system memory 1415, the permanent storage device 1425, and/or the read-only memory 1420.

The bus 1405 also connects to the input and output devices 1430 and 1435. The input devices enable the user to communicate information and select commands to the computer system. The input devices 1430 include, but are not limited to, alphanumeric keypads (including physical keyboards and touchscreen keyboards) and pointing devices (also called "cursor control devices"). The input devices 1430 also include audio input devices (e.g., microphones, MIDI musical instruments, etc.). The output devices 1435 display images generated by the computer system. The output devices include, but are not limited to, printers and display devices, such as cathode ray tubes (CRT) or liquid crystal displays (LCD).

Finally, as shown in FIG. 14, bus 1405 also couples computer 1400 to a network 1465 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1400 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A machine implemented method for offsetting usage of a service provider data network amongst end users and content providers, wherein the service provider data network provides a plurality of end users access to content of the content providers from an external data network, the machine implemented method comprising:

modifying operation of a packet data network gateway (PDN GW) server with a plurality of Uniform Resource Locators (URLs) of free-to-user first content of a particular content provider, wherein the free-to-user first content is delivered to any end user of the plurality of end users without a receiving end user incurring data network usage fees in receiving the free-to-user first content, wherein the PDN GW server comprises a microprocessor, memory, and a network interface, and wherein the PDG GW server connects the service provider data network to the external data network;

inspecting by operation of the PDN GW server, a plurality of content passing from the external data network through the service provider data network to a particular end user of the plurality of end users, wherein said inspecting comprises scanning HyperText Transfer Protocol (HTTP) headers of the plurality of packets, detecting presence or absence of the plurality of URLs in said headers, and serving said plurality of content to the particular end user over the service provider data network;

differentiating from the plurality of content in response to said inspecting, a first subset of free-to-user content comprising one URL from the plurality of URLs from a second subset of user chargeable content omitting all URLs from the plurality of URLs;

modifying usage allocation of the service provider data network based on said differentiating, wherein said modifying comprises metering to said PDN GW server memory, a first set of usage of the data network resulting from the particular end user receiving the first subset of free-to-user content comprising one URL from the plurality of URLs differently than a second set of usage of the data network resulting from the particular end user receiving the second subset of user chargeable content omitting all URLs from the plurality of URLs;

transmitting the first set of the data network usage and the second set of the data network usage from the PDN GW server over a digital network to a billing server of the service provider; and performing at the billing server in response to said transmitting, offset billing based on the data network usage associated with delivering the plurality of content to the particular end user, wherein performing the offset billing comprises alerting the particular end user of network usage by (i) billing the particular end user according to the second set of data network usage incurred in delivering, to the particular end user, the second subset of user chargeable content and (ii) not billing the particular end user for the first set of data network usage incurred in delivering the first subset of free-to-user content.

2. The machine implemented method of claim 1, wherein performing the offset billing further comprises billing the particular content provider according to the first set of data network usage incurred in delivering, to the particular end user, the first subset of free-to-user content and not billing the particular content provider for the second set of data network usage incurred in delivering the second subset of user chargeable content to the particular end user.

3. The machine implemented method of claim 1 further comprising tracking by operation of the PDN GW microprocessor the first and second sets of data network usage associated with delivering the plurality of content to a specific end user usage log tracking the particular end user's usage.

4. The machine implemented method of claim 3 further comprising filtering by operation of the PDN GW microprocessor the first set of data network usage resulting from delivery of the first subset of free-to-user content to the particular end user from the specific end user usage log.

5. The machine implemented method of claim 4 further comprising entering to a content provider usage log of the particular content provider by operation of the PDN GW microprocessor, the first set of data network usage resulting from delivery of the first subset of free-to-user content to the particular end user.

6. The machine implemented method of claim 5, wherein said transmitting comprises transmitting the specific end user usage log and the content provider usage log to the billing server, and wherein performing the offset billing further comprises processing the specific end user usage log in billing the particular end user and processing the content provider usage log in billing the particular content provider.

7. The machine implemented method of claim 1, wherein the particular end user is a first end user of the plurality of end users, the method further comprising inspecting free-to-user third content comprising one of the plurality of URLs passing from the external data network through the service provider data network to a second end user of the plurality of end users, wherein the second end user is different from the first end user.

8. The machine implemented method of claim 7, wherein performing the offset billing further comprises billing the particular content provider according to the data network usage incurred in delivering to the second end user, the free-to-user third content.

9. The machine implemented method of claim 1, wherein the external data network is a content delivery network (CDN) comprising a point-of-presence (PoP) with at least one caching server serving the content of the content providers to the plurality of end users.

10. The machine implemented method of claim 1, wherein the external data network is the Internet.

11. A method for offsetting usage of a service provide data network amongst (i) a plurality of end users utilizing the service provider data network for access to content from an external data network and (ii) a plurality of content providers providing said content from the external data network, the method comprising:
   caching to memory of a caching server at an edge of the service provider data network connecting to the external data network, a subset of said content from the external data network comprising at least one of a set of identifiers designating content with data network usage billable to a content provider instead of a receiving end user;
   serving in response to requests from the plurality of end users comprising one of the set of identifiers, said subset of content from the caching server without accessing a content provider in the external data network originating said subset of content;
   differentiating by operation of a gateway server based on the set of identifiers, content passing from the plurality of content providers in the external data network and the caching server to any of the plurality of end users operating in a service region of the service provider data network as (i) first content with data network usage billable to an end user receiving the first content and (ii) second content comprising the subset of content with data network usage billable to a particular content provider originating the second content, wherein the gateway server connects the plurality of end users operating from the service provider data network to the content of the plurality of content providers in the external data network, the gateway server comprising a microprocessor, memory, and a network interface;
   tracking by operation of the gateway server (i) a first amount of data network usage by a particular end user of the plurality of end users incurred from delivery of the first content to the particular end user from the plurality of content providers in the external data network and (ii) a second amount of data network usage by the particular end user incurred from delivery of the second content to the particular end user from the caching server at the edge of the service provider data network; and
   transmitting the first amount of the data network usage and the second amount of the data network usage by the particular end user over a digital network to a billing server of the service provider; and
   activating billing operation of the billing server in response to said transmitting, wherein said activating comprises (i) providing a first bill to the particular end user based on the first amount of data network usage by the particular end user and (ii) providing a second bill to the particular content provider based on the second amount of data network usage by the particular end user.

12. The method of claim 11 further comprising tracking a third amount of data network usage incurred from delivery of the second content to a second different end user of the plurality of end users.

13. The method of claim 12, wherein the second bill is further based on the third amount of data network usage by the second different end user.

14. A method comprising:
   receiving with a packet inspection server connected to a data network, a first set of HyperText Transfer Protocol (HTTP) packets comprising first content data entering the data network from an external data network and destined for an end user device associated with a user account and connected to the data network, the first content data associated with a content provider, and the first set of HTTP packets including headers with an identifier designating the first content as free-to-user content;
   inspecting the first content data by operation of the packet inspection server, wherein said inspecting comprises identifying the identifier designating the first content as free-to-user content in the headers of the first set of HTTP packets, and determining that the identifier designating the first content as free-to-user content is associated with the content provider;
   generating a first log entry containing first log entry information, the first log entry information including an identifier of the end user device, an identifier of the first content data, an indication of data network usage, and an indication that such data network usage is not chargeable to the end user;
   generating a second log entry containing second log entry information, the second log entry information including an identifier of a content source, the identifier of the first content data, the indication of data network usage, and an indication that such data network usage is chargeable to the content provider;
   receiving with the packet inspection server, a second set of HTTP packets comprising second content data entering the data network from the external data network and destined for the end user device, wherein headers of the second set of HTTP packets omit an identifier designating the second content as free-to-user content;
   inspecting the second content data by operation of the packet inspection server, wherein said inspecting comprises identifying the identifier designating the second content as free-to-user content being omitted from the headers of the second set of HTTP packets;
   generating a third log entry containing third log entry information, the third log entry information including the identifier of the end user device, an identifier of the third content data, an indication of data network usage, and an indication that such data network usage is chargeable to the end user;
   providing a first bill to the user account, the first bill including the first log entry information and third log entry information; and
   providing a second bill to the content provider, the second bill including the second log entry information.

15. The method of claim 14, wherein the identifier designating the first content as free-to-user content comprises a Uniform Resource Locator (URL) associated with the first content data.

16. The method of claim 14, further comprising:
   receiving at the packet inspection server a request from the end user device to obtain the first content data, the request including the identifier designating the first content as free-to-user content; and determining at the packet inspection server that the request includes the identifier designating the first content as free-to-user content;

wherein the request from the end user device is a Hyper-Text Transport Protocol (HTTP) request and determining at the packet inspection server that the request includes the identifier designating the first content as free-to-user content includes identifying a URL in the HTTP request as the identifier designating the first content as free-to-user content.

17. The method of claim 14, further comprising:

providing an interface to the content provider, the interface permitting the content provider to identify the first content data as free-to-user content;

assigning the identifier designating the first content as free-to-user content; and providing the identifier designating the first content as free-to-user content to the packet inspection server and storing the identifier designating the first content as free-to-user content at the packet inspection server in a collection of identifiers;

wherein determining that the first content data contains the identifier designating the first content as free-to-user content includes comparing the first content data to the collection of identifiers.

18. The method of claim 14, wherein the indication that data network usage is not chargeable to the end user includes indicating a zero usage of data.

\* \* \* \* \*